(12) United States Patent
Mukai et al.

(10) Patent No.: US 9,194,939 B2
(45) Date of Patent: Nov. 24, 2015

(54) RADAR APPARATUS

(75) Inventors: Hirohito Mukai, Tokyo (JP); Takaaki Kishigami, Tokyo (JP); Yoichi Nakagawa, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 385 days.

(21) Appl. No.: 13/812,124

(22) PCT Filed: Jun. 3, 2011

(86) PCT No.: PCT/JP2011/003145
§ 371 (c)(1),
(2), (4) Date: Jan. 24, 2013

(87) PCT Pub. No.: WO2012/014359
PCT Pub. Date: Feb. 2, 2012

(65) Prior Publication Data
US 2013/0229297 A1 Sep. 5, 2013

(30) Foreign Application Priority Data
Jul. 28, 2010 (JP) ................. 2010-169293

(51) Int. Cl.
G01S 13/42 (2006.01)
G01S 7/34 (2006.01)
(Continued)

(52) U.S. Cl.
CPC ... *G01S 7/34* (2013.01); *G01S 7/28* (2013.01); *G01S 7/2922* (2013.01); *G01S 13/0209* (2013.01); *G01S 13/42* (2013.01)

(58) Field of Classification Search
CPC ..... G01S 7/34; G01S 7/2922; G01S 13/0209; G01S 13/42; G01S 7/28
USPC .............. 342/92, 88, 74, 79, 133, 139, 146
See application file for complete search history.

(56) References Cited

U.S. PATENT DOCUMENTS 3,643,257 A * 2/1972 Thomson et al. ............... 342/92
3,659,290 A 4/1972 Bourque
(Continued)

FOREIGN PATENT DOCUMENTS

CN 1639584 A 7/2005
CN 101586929 A 11/2009
(Continued)

OTHER PUBLICATIONS

Extended European Search Report dated Jun. 20, 2014, for corresponding EP Application No. 11811966.8-1812/ 2600167, 8 pages.
(Continued)

*Primary Examiner* — John B Sotomayor
(74) *Attorney, Agent, or Firm* — Seed IP Law Group PLLC

(57) ABSTRACT

A pulse signal is produced in a pulse generating section, and repetitively transmitted from an antenna at constant time intervals. A reception signal, received through an antenna and including a reflective wave from an object, is amplified and gain-adjusted. Thereafter, a distance detecting section detects a reception pulse of the reflected wave, and calculates the distance to the object. The variable attenuator attenuates the reception signal by a gain adjusted in accordance with a gain control signal. The gain of the variable attenuator is controlled so as to be maximum immediately after the pulse signal is transmitted, and to be reduced with elapse of time. Based on a gain adjustment timing signal, a gain adjustment timing when the attenuation amount is changed is made different for each transmission of the pulse signal.

10 Claims, 18 Drawing Sheets

(51) Int. Cl.
*G01S 7/28* (2006.01)
*G01S 13/02* (2006.01)
*G01S 7/292* (2006.01)

(56) References Cited

U.S. PATENT DOCUMENTS

| | | | |
|---|---|---|---|
| 4,833,480 A * | 5/1989 | Palmer et al. | 342/125 |
| 5,311,184 A | 5/1994 | Kuntman | |
| 2004/0033789 A1 | 2/2004 | Tsien | |
| 2006/0044180 A1 | 3/2006 | Ikeda et al. | |
| 2006/0187111 A1 | 8/2006 | Uchino | |
| 2007/0216567 A1* | 9/2007 | Ikeda | 342/92 |
| 2008/0246650 A1* | 10/2008 | Teshirogi et al. | 342/204 |
| 2010/0265121 A1* | 10/2010 | Bandhauer et al. | 342/135 |

FOREIGN PATENT DOCUMENTS

| | | |
|---|---|---|
| EP | 1 630 571 A1 | 3/2006 |
| JP | 60-088377 A | 5/1985 |
| JP | 61-077775 A | 4/1986 |
| JP | 63-144278 A | 6/1988 |
| JP | 02-027285 A | 1/1990 |
| JP | 3-142392 A | 6/1991 |
| JP | 06-284022 A | 10/1994 |
| JP | 6-86093 A | 12/1994 |
| JP | 7-167954 A | 7/1995 |
| JP | 09-027723 A | 1/1997 |
| JP | 11-023696 A | 1/1999 |
| JP | 11-118943 A | 4/1999 |
| JP | 11-174143 A | 7/1999 |
| JP | 2001-136097 A | 5/2001 |
| JP | 2002-151987 A | 5/2002 |
| JP | 2006-64644 A | 9/2006 |
| JP | 2006-329690 A | 12/2006 |
| JP | 2007-147406 A | 6/2007 |
| JP | 2009-273053 A | 11/2009 |
| JP | 2010-145358 A | 7/2010 |
| WO | 2005/076035 A1 | 8/2005 |

OTHER PUBLICATIONS

International Search Report, mailed Sep. 6, 2011, for International Application No. PCT/JP2011/003145, 4 pages.

* cited by examiner

RADAR APPARATUS

TECHNICAL FIELD

The present invention relates to a radar apparatus, and more particularly to a radar apparatus which uses the wideband pulse technology.

BACKGROUND ART

Conventionally, there are radar apparatuses which transmit a radio wave, and which receive a reflected wave that is produced by reflecting the transmission signal from an object, thereby identifying the position of the object. In radar apparatuses of this kind, a pulse signal which has been converted to a radio frequency is often used as the transmission signal. The signal power of a pulse signal attenuates during a period from transmission to reception after reflection from an object.

When the reflected wave is a wave reflected from an object at a closer distance, therefore, the power of the reception signal is higher, and, when the reflected wave is that reflected from an object at a remoter distance, the power is lower. Consequently, a radar apparatus requires a circuit for amplifying a reflected wave from an object at a remote distance. Conventionally, an STC (Sensitive-Time-Control) circuit has been used as an amplification circuit of a radar apparatus.

FIG. 17 is a block diagram showing the configuration of a radar apparatus of a conventional example. In the radar apparatus, a transmission signal which is a pulse signal generated in a transmitter 1001 is transmitted into a space from an antenna 1003 via a transmission/reception switching device 1002. A reception signal which is received from the space by the antenna 1003 is input to a receiver 1004 via the transmission/reception switching device 1002. In the receiver 1004, the reception signal is amplified in amplifiers 1005, 1006, and subjected to a demodulation process, thereby obtaining a demodulated signal. The demodulated reception signal is sent to an indicator 1007 such as a monitor device to be displayed thereon (see Patent Document 1).

FIGS. 18(a) to 18(c) are waveform charts illustrating the operation of the radar apparatus of the conventional example. FIG. 18(a) shows a reception signal in the radar apparatus. In the figure, the ordinate indicates the reception power, and the abscissa indicates the distance (time). In FIG. 18(a), the manner is shown in which the pulse signal transmitted at time 0 is received while attenuating with elapse of time.

In FIG. 18(a), e1, e2, and e3 indicate a strong reflected wave from a reflection object. Although the reflection coefficient of a radio wave depends on the size and shape of a reflection object, the signal power of a reception signal in a radar apparatus is largely affected by the distance of the reflection object.

FIG. 18(b) shows the amplification factor of an amplifier of the receiver of the radar apparatus. In the figure, the ordinate indicates the amplification factor, and the abscissa indicates the distance (time). The amplification factor in amplification of the reception signal is controlled so as to be increased with the elapsed time from the transmission of the pulse signal. When the reflected wave is received from a near object, therefore, the amplification factor is reduced, and, when the reflected wave is received from a remote object, the amplification factor is increased.

FIG. 18(c) shows the signal power after the amplification in the radar apparatus. In the figure, the ordinate indicates the signal power, and the abscissa indicates the distance (time). In this way, the difference in reception power between the reflected wave from a close distance and that from a remote distance can be made small.

When the amplification factor of the amplifier is adjusted in accordance with the distance (time) by using the above-described method, the dynamic range of the reception signal can be reduced, and the quantization bit number of an AD converter which is continuous to the rear stage of the receiver can be reduced.

Patent Document 2 discloses a configuration where, in place of the method of adjusting the amplification factor of an amplifier, the attenuation factor of an attenuator (STS attenuator) connected to the front or rear stage of the amplifier is changed. In the configuration, contrary to the method of adjusting the amplification factor of an amplifier shown in FIG. 18(b), a control in which the attenuation factor of the attenuator is reduced with elapse of time is performed. According to the configuration, it is possible to obtain a signal similar to the reception signal shown in FIG. 18(c).

PRIOR ART REFERENCE

Patent Document

Patent Document 1: JP-A-61-77775
Patent Document 2: JP-A-11-23696

SUMMARY OF THE INVENTION

Problems that the Invention is to Solve

In a conventional radar apparatus which is to be used in a ship or the like, the influence of signal distortion occurring in adjustment of the gain (the amplification factor or the attenuation factor) of an amplifier or an attenuator is not large, and a problem does not particularly arise. In the case where a radar apparatus is used for a purpose such as sensing in which the detection range includes a position at a short distance of 10 meters or less, however, a high-resolution radar apparatus is requested. In the case of a pulse radar in which a pulse signal is used as a transmission signal, a technique for increasing the resolution is to use a wideband pulse signal.

A wideband pulse signal has a very narrow pulse width. Therefore, a problem arises in the case where the pulse width is shorter than the response time between the timing when a gain control signal for controlling the gain of the amplifier or the attenuator is input, to that when the setting is actually reflected. In this case, with respect to the pulse width of the reception signal, the influence of signal distortion in the response time becomes large and non-negligible. In a system in which the reception signal is orthogonally modulated, or that in which an orthogonally modulated signal is signal processed, there is case where the influence of signal distortion in the response time cannot be negligible.

In an attenuator configured by a usual TTL or the like, the response speed (response time) is about 75 ns. This shows that the required time from setting of the attenuation factor to the timing when the attenuation factor is stabilized at the set value is 75 ns. In order to obtain resolution of 0.3 m, for example, a pulse having a width of 1 ns must be used.

In the case of resolution of 3 m, a pulse having a width of 10 ns is required. The above-described response time is not a time which is negligible with respect to the pulse width. Therefore, the reception signal which is received during the response time of the adjustment of the gain of the amplifier or the attenuator degrades due to distortion, thereby causing a problem in that the accuracy of detection of the reception pulse is lowered.

The invention has been conducted in view of the above-discussed circumstances. It is an object of the invention to reduce the influence of signal distortion which occurs during adjustment of the gain of a receiving unit of a radar apparatus, and improve degradation of a reception signal.

Means for Solving the Problems

The radar apparatus of the invention includes: a transmission signal producing section that produces a transmission signal which is an intermittent signal having a predetermined signal width and signal interval; a transmission RF section that wirelessly transmits the transmission signal to a measurement space; a reception RF section that receives a reception signal including a reflected wave from an object, from the measurement space; a level adjusting section that adjusts a level of the reception signal by a variable gain; a gain adjusting section that produces a gain control signal that adjusts a gain in the level adjusting section; a timing adjusting section that produces a gain adjustment timing signal which controls a timing of the gain adjustment in the level adjusting section; and an object detecting section that detects the object based on the reception signal. The gain adjusting section produces the gain control signal which increase the level of the reception signal with elapse of time from a timing of transmission of the transmission signal, and the timing adjusting section produces the gain adjustment timing signal in which the gain adjustment timing in the level adjusting section is different for each transmission of the transmission signal.

According to the configuration, in the radar apparatus, a degraded portion of the reception signal which is generated in the response time required in the gain adjustment of the level adjusting section can be dispersed in a zone which is different for each transmission of the transmission signal. In the radar apparatus, therefore, the accuracy of detection of the signal of the reflected wave due to degradation of the reception signal can be prevented from being lowered.

Effects of the Invention

According to the invention, it is possible to reduce the influence of signal distortion which occurs during adjustment of the gain of a receiving unit of the radar apparatus, and degradation of the reception signal can be improved.

MODE FOR CARRYING OUT THE INVENTION

Hereinafter, as embodiments of the invention, configuration examples of the radar apparatus, and their operations will be described. In the embodiments, configurations of the case where a wideband pulse signal is used as a transmission signal in order to increase the resolution of the radar apparatus will be exemplarily described.

First Embodiment

Figure 1:
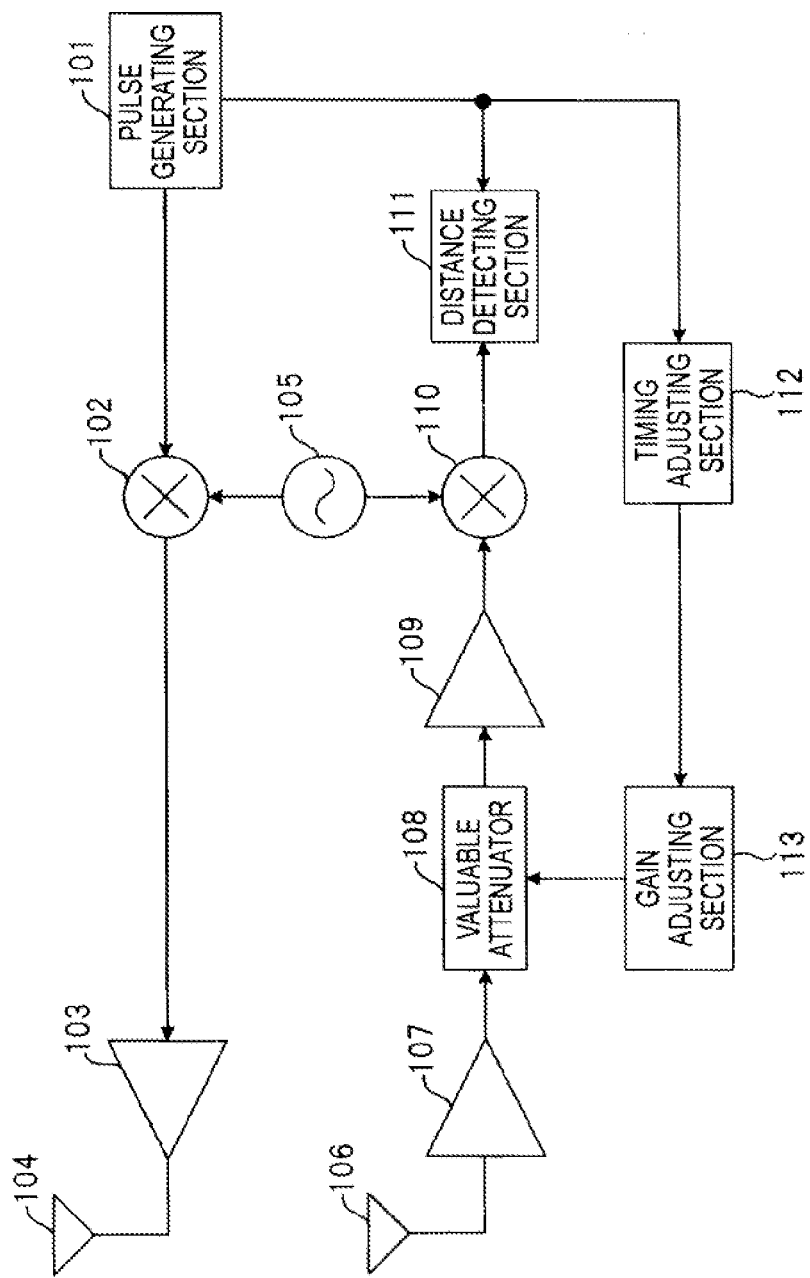
FIG. 1 is a block diagram showing the configuration of a radar apparatus of a first embodiment of the invention.

FIG. 1 is a block diagram showing the configuration of a radar apparatus of a first embodiment of the invention. The radar apparatus includes a pulse generating section 101, a frequency converting section 102, an amplifier 103, an antenna 104, and a local oscillator 105, as a transmitting unit. The radar apparatus further includes an antenna 106, amplifiers 107, 109, a variable attenuator 108, a frequency converting section 110, a distance detecting section 111, a timing adjusting section 112, and a gain adjusting section 113, as a receiving unit.

Here, the frequency converting section 102, the amplifier 103, and the antenna 104 are disposed as an example of a configuration realizing the function of a transmission RF section. Moreover, the antenna 106, the amplifier 107, and the frequency converting section 110 are disposed as an example of a configuration realizing the function of a reception RF section.

The pulse generating section 101 is an example of a configuration realizing the function of a transmission signal producing section, and, as a transmission signal, repetitively produces and outputs a pulse signal (transmission pulses) having a predetermined pulse width at predetermined time intervals. The produced pulse signal is input to the frequency converting section 102. At this time, the pulse generating section 101 outputs a transmission timing signal indicating the production timing (pulse transmission timing) of the pulse signal, to the distance detecting section 111 and timing adjusting section 112 of the receiving unit.

In the case where a pulse signal is used as the transmission signal, the transmission interval of the transmission pulses indicates the distance which can be measured. Namely, a time (time interval) which is longer (wider) than the time from the time when the pulse signal is transmitted from the radar apparatus, to that when the signal is reflected from an object at the supposed maximum detection distance to be received by the radar apparatus is set as the transmission interval of the pulse signal. The pulse width of the transmission pulses is related to the resolution in measurement. The shorter the pulse width, the shorter the distance at which reflected waves from a plurality of objects can be separated from each other, and the higher the resolution can be obtained.

In the embodiment, as the transmission signal, used is a signal in which a single pulse signal having a predetermined pulse width is repetitively transmitted at a predetermined period. However, the transmission signal is not limited to this as far as it is an intermittent signal which has a predetermined signal width and a predetermined signal interval in accordance with the range where an object is to be detected, and the resolution. For example, a pulse signal including a plurality of pulse strings, or a modulated signal in which a pulse signal including a single or plurality of pulse strings is frequency- or phase-modulated may be used.

The frequency converting section 102 is configured by a mixer and the like, mixes the pulse signal produced by the pulse generating section 101, with a local signal output from the local oscillator 105, and upconverts the base-band pulse signal to a radio frequency. The upconverted pulse signal is input to the amplifier 103.

Here, the configuration where the frequency converting section 102 upconverts the pulse signal to a radio frequency by using the mixer has been described. However, the invention is not limited to this. For example, a configuration where a radio frequency pulse signal is directly oscillated by using a step recovery diode may be employed.

The amplifier 103 amplifies the transmission signal of the radio signal which is upconverted to the radio frequency. The amplified radio signal is transmitted to a measurement space through the transmission antenna 104. In the case where an object exists in the measurement space, the signal transmitted from the antenna 104 of the radar apparatus is reflected by the object, and the signal of the reflected wave is received by the reception antenna 106. Alternatively, the transmission antenna and the reception antenna may be shared by one antenna.

The radio signal received by the antenna 106 of the radar apparatus is input to the amplifier 107 in the front stage. The amplifier 107 amplifies the reception signal of the radio signal which is received by the antenna 106. The reception signal includes the signal of the reflected wave from the object. The reception signal amplified in the amplifier 107 is input to the variable attenuator 108.

The variable attenuator 108 is an example of a configuration realizing the function of a level adjusting section, and configured by having an attenuator of the variable gain type in which the attenuation factor can be changed. The variable attenuator 108 receives a gain control signal supplied from the gain adjusting section 113, and the reception signal supplied from the amplifier 107. The variable attenuator 108 adjusts the gain (attenuation amount) in accordance with the gain control signal, and attenuates the reception signal supplied from the amplifier 107, by the adjusted gain to adjust the level of the reception signal.

The gain adjustment will be described later. The amplifier 109 in the rear stage amplifies the reception signal which is output from the variable attenuator 108, and which has undergone the variable gain attenuation, and output the amplified signal. The signal which is amplified in the amplifier 109 is input to the frequency converting section 110.

The frequency converting section 110 is configured by a mixer and the like, mixes the output signal of the amplifier 109 with the local signal output from the local oscillator 105, and downconverts the reception signal of the radio frequency to the base band. The downconverted signal is input to the distance detecting section 111.

The distance detecting section 111 is an example of a configuration realizing the function of an object detecting section. The distance detecting section 111 receives the reception signal which is downconverted to the base band, performs processes of a detection process, a pulse detection process, and a distance detection process, and calculates the distance to the object. The pulse detection process is a process of detecting a pulse (receiving pulse) of the reflected wave from the object, and the pulse component in the reception signal is detected by using a comparator and the like.

The distance detection process is a process of detecting the distance to the object from which the reflected wave is generated, measures the time from the transmission of the pulse signal to the detection of the reception pulse of the reflected wave, and converts the time to a distance. The distance detecting section 111 outputs information of the calculated distance to an information processing section, displaying section, and the like which are in the rear stage. The information processing section can perform various information processes related to the detected object by using the distance information, and the displaying section can display the distance information.

The timing adjusting section 112 receives the transmission timing signal output from the pulse generating section 101. The timing adjusting section 112 measures the time elapsed from the pulse transmission timing. The timing adjusting section 112 produces a gain adjustment timing signal for adjusting the gain of the variable attenuator 108 in accordance with the elapsed time, and outputs the signal to the gain adjusting section 113. The method of controlling the timing of the gain adjustment will be described later.

The gain adjusting section 113 receives the gain adjustment timing signal output from the timing adjusting section 112. In accordance with the gain adjustment timing signal, the gain adjusting section 113 produces the gain control signal for setting the gain (attenuation amount) of the variable attenuator 108 to a preset value, and supplies the signal to the variable attenuator 108.

Figure 2:
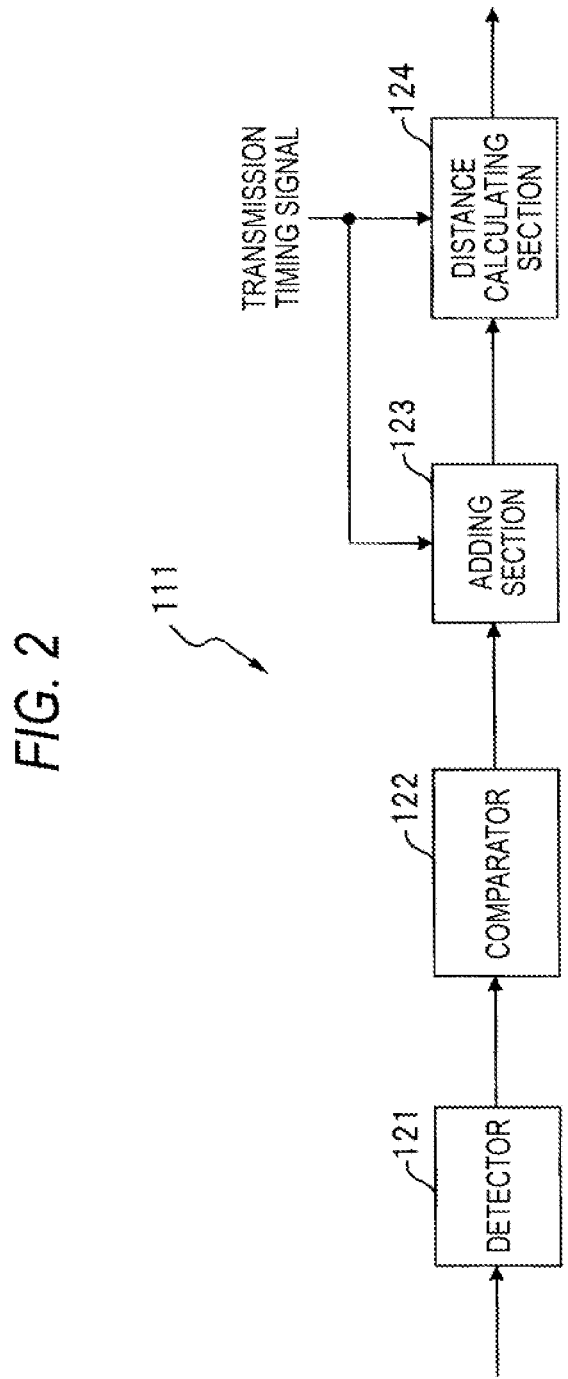
FIG. 2 is a block diagram showing the configuration of a distance detecting section in the first embodiment.

FIG. 2 is a block diagram showing the configuration of the distance detecting section in the first embodiment. The distance detecting section 111 is configured by having a detector 121, a comparator 122, an adding section 123, and a distance calculating section 124.

The detector 121 receives the reception signal which is downconverted to the base band. The detector 121 converts the real and imaginary part signals of the reception signal to a power-domain signal (hereinafter, this is referred to as "signal power"), and outputs signal power (detection signal) indicating the electric power. The detection signal which is converted to the power domain is supplied to the comparator 122.

The comparator 122 is an example of a configuration realizing the function of a reflected wave detecting section. The comparator 122 compares the signal power of the supplied detection signal with a predetermined threshold. The comparator 122 determines from the result of the comparison whether the signal power is larger than the predetermined threshold or not, to perform detection of the reception pulse (pulse detection), and outputs the result of the pulse detection in the form of a binary value. The result of the pulse detection of the reception pulse is supplied to the adding section 123.

The adding section 123 adds together a predetermined number of times the result of the pulse detection in a zone from the transmission of the pulse signal from the transmitting unit to that of the next pulse signal. The addition number is N times the number of gain control patterns of the variable attenuator 108 which will be described later. Here, N is an integer. For example, the adding section 123 adds together about 100 times the result of the pulse detection. As a result of the addition process, the detected reception pulse is averaged. The head of the addition process is determined in accordance with the transmission timing signal output from the pulse generating section 101. The result of the addition is supplied to the distance calculating section 124.

The distance calculating section 124 receives the addition result which is the output of the adding section 123, and the transmission timing signal supplied from the pulse generating section 101, and obtains the time from the transmission timing of the transmission pulse to the detection of the reception pulse, thereby calculating from the time the distance to the object.

Figure 3:
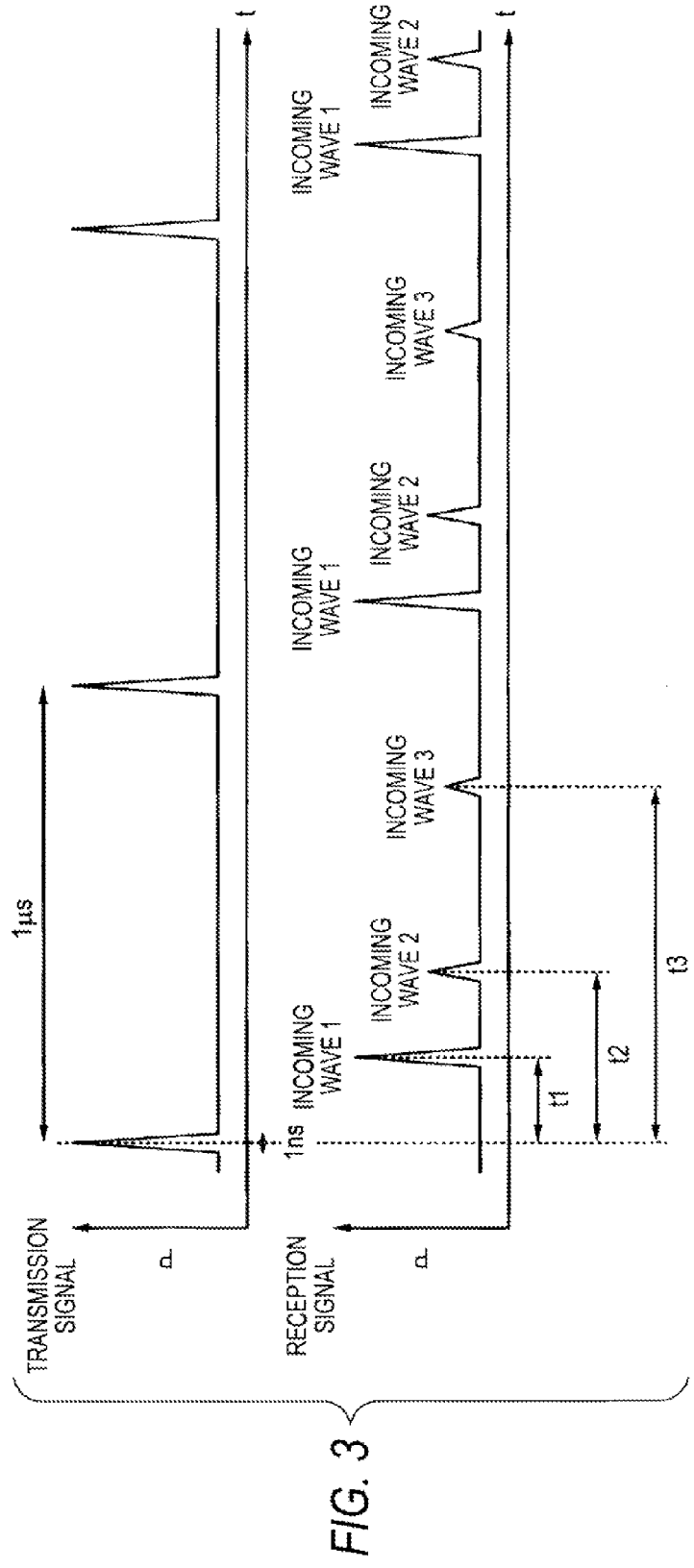
FIG. 3 is an operational diagram showing an example of signals to be transmitted and received in the radar apparatus of the embodiment.

FIG. 3 is an operational diagram showing an example of signals to be transmitted and received in the radar apparatus of the embodiment. In FIG. 3, the upper stage shows the transmission signal, the lower stage shows the reception signal, the abscissa indicates the time t, and the ordinate indicates the signal power P. The reception signal shown in the lower stage is that obtained in the case where the gain of the variable attenuator 108 is not adjusted and is maintained constant.

The transmission signal shown in the upper stage is an example in which a pulse signal having a width of 1 ns is repetitively transmitted at intervals of 1 μs. At this time, until a period of 1 μs elapses after transmission of one pulse, the next pulse is not transmitted. The above-described pulse width (1 ns) and pulse transmission interval (1 μs) are an example, and the pulse width and the interval are not limited to the example.

The reception signal shown in the lower stage is an example of a signal which is output from the detector 121 in the case where three objects (reflection objects) exist. It is assumed that the distances of the reflection objects are different from each other, Reflection object 1 is placed at the shortest distance, Reflection object 3 is placed at the longest distance, and Reflection object 2 is located between Reflection objects 1 and 3.

The reception signal (the output of the detector) of the radar apparatus in the case where Reflection object 1, Reflection object 2, and Reflection object 3 exist in the positional relationships are the reception signal shown in the lower stage of FIG. 3. In this case, the reception pulse of the reflected wave from Reflection object 1 is Incoming wave 1, that of the reflected wave from Reflection object 2 is Incoming wave 2, and that of the reflected wave from Reflection object 3 is Incoming wave 3.

The distance to a reflection object is obtained from the time from transmission of a pulse signal to reception of an incoming wave by using following Expression (1).

$$L = c \times t \div 2 \quad (1)$$

where L is the distance to the reflection object, c is the speed of light, and t is the time from transmission of a pulse signal to reception of an incoming wave of a reflected wave.

The distance to Reflection object 1 is obtained by substituting t=t1 for t in Expression (1) above. With respect to Reflection objects 2 and 3, similarly, the distances are obtained by substituting t=t2, t3 for t in Expression (1) above, respectively.

Since the transmission signal is repetitively transmitted at the constant time intervals, Incoming wave 1, Incoming wave 2, and Incoming wave 3 are repetitively received.

Figure 4:
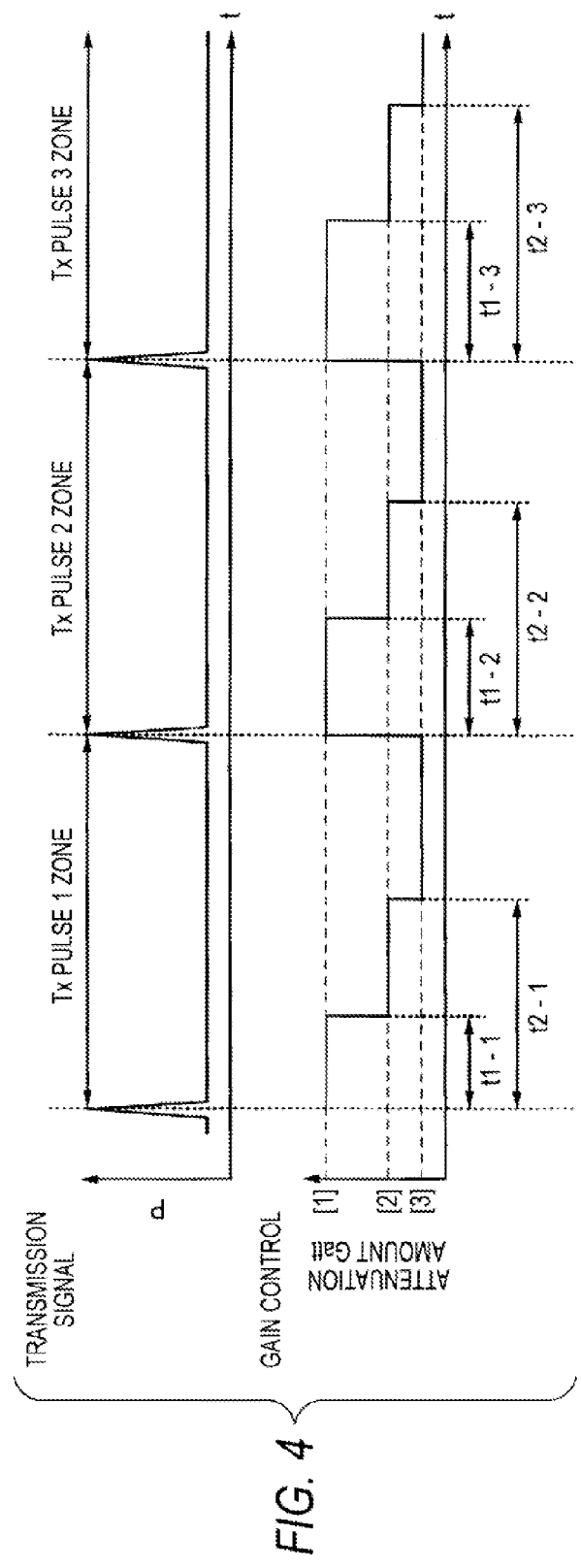
FIG. 4 is an operational diagram showing a method of adjusting the gain of a variable attenuator in the first embodiment.

FIG. 4 is an operational diagram showing a method of adjusting the gain of the variable attenuator 108 in the first embodiment, and shows time relationships between the transmission signal and the gain adjustment in the variable attenuator. In FIG. 4, the abscissa indicates the time t. The upper stage shows the transmission signal, and the ordinate indicates the signal power P. The lower stage shows the gain control amount (gain control pattern) with respect to the transmission signal, and the ordinate indicates the attenuation amount Gatt (dB) of the variable attenuator. The illustrated example shows the case where the number of gain control patterns is 3.

The gain (attenuation amount) of the variable attenuator 108 is maximum immediately after the pulse signal is transmitted, and controlled so as to be reduced with elapse of time. Namely, the gain of the variable attenuator 108 is adjusted so that, after the timing of transmitting the transmission signal, the level of the reception signal is increased with elapse of time.

Here, as an example of the attenuation amount of the variable attenuator 108, the control method will be described by using a method in which adjustment is performed in three steps. The attenuation amount is not limited to the three steps. For the sake of description, here, the largest one of the three steps of attenuation amount is indicated as Attenuation amount [1], the intermediate attenuation amount is indicated as Attenuation amount [2], and the smallest attenuation amount is indicated as Attenuation amount [3].

In a Tx pulse 1 zone where a first pulse signal is transmitted, the time from the timing when the pulse signal is transmitted, to that when the attenuation amount is changed from Attenuation amount [1] to Attenuation amount [2] is indicated as t1-1. The time from the timing when the pulse signal is transmitted, to that when the attenuation amount is changed from Attenuation amount [2] to Attenuation amount [3] is indicated as t2-1.

Similarly, in a Tx pulse 2 zone where a second pulse signal is transmitted, the time from the timing when the pulse signal is transmitted, to that when the attenuation amount is changed from Attenuation amount [1] to Attenuation amount [2] is indicated as t1-2, and the time from the timing when the pulse signal is transmitted, to that when the attenuation amount is changed from Attenuation amount [2] to Attenuation amount [3] is indicated as t2-2.

Similarly, in a Tx pulse 3 zone where a third pulse signal is transmitted, the time from the timing when the pulse signal is transmitted, to that when the attenuation amount is changed from Attenuation amount [1] to Attenuation amount [2] is indicated as t1-3, and the time from the timing when the pulse signal is transmitted, to that when the attenuation amount is changed from Attenuation amount [2] to Attenuation amount [3] is indicated as t2-3.

Here, the time until the attenuation amount is changed from Attenuation amount [1] to Attenuation amount [2] is assumed that t1-1≠t1-2≠t1-3. Moreover, it is assumed that |(t1-1)−(t1-2)|=RT and |(t1-2)−(t1-3)|=RT where RT is "response time required for the attenuation amount adjustment".

Furthermore, the time until the attenuation amount is changed from Attenuation amount [2] to Attenuation amount

[3] is assumed that t2-1≠t2-2≠t2-3. Moreover, it is assumed that |(t2-1)−(t2-2)|=RT and |(t2-2)−(t2-3)|=RT.

In each transmission of the pulse signal, the timing of adjusting the gain from Attenuation amount [1] to Attenuation amount [2], and that of adjusting the gain from Attenuation amount [2] to Attenuation amount [3] are made different. Moreover, the differences of the gain adjustment timings of the transmission pulse zones are set so as to be larger than the response time RT required for the attenuation amount adjustment. Here, "response time required for the attenuation amount adjustment" is also "response time of the attenuation amount change", and corresponds to an example of "response time required in the gain adjustment".

In other words, the attenuation amount is changed while the gain adjustment timing is shifted in each transmission of the transmission signal by an amount corresponding to a time which is longer than the response time that is required for the gain adjustment in the variable attenuator 108. According to the configuration, in each transmission pulse zone, the response time from the input of the gain control signal for controlling the gain of the attenuator to the timing when the setting is actually reflected is prevented from overlapping with another transmission pulse zone. Namely, the transient period elapsing before the gain adjustment is stabilized in the variable attenuator 108 is prevented from overlapping with another transmission pulse zone.

Although the three kinds of gain control patterns in which the gain adjustment timing is changed are shown in the illustrated example, the number of kinds of different gain adjustment patterns is not limited to three. In the illustrated example, in order to avoid an influence of the response time of the change of the attenuation amount in the reception signal, the gain adjustment timing is shifted in each transmission of the transmission signal by the response time of the change of the attenuation amount. However, the invention is not limited to this.

When, in accordance with the response time of the level adjusting section such as the variable attenuator, the pulse width of the transmission signal, and the like, the gain adjustment timing is changed in each transmission of the transmission signal by at least the response time which is required for the gain adjustment, or longer, the effect that degradation of the reception signal can be suppressed is attained.

Figure 5:
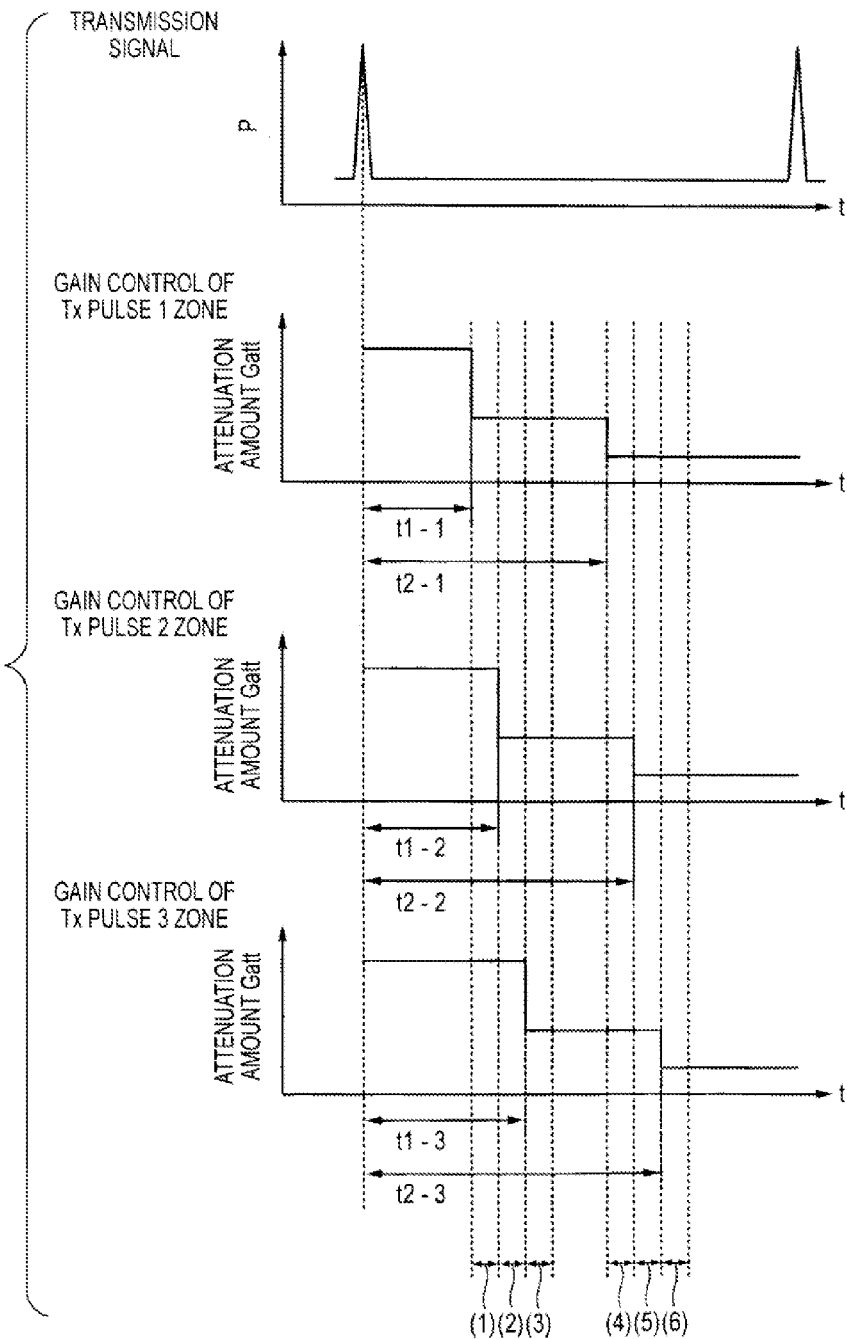
FIG. 5 is a view showing relationships between the gain control of the variable attenuator and a response time (response time of a change of the attenuation amount) until the gain is actually set when the gain of the variable attenuator is changed.

FIG. 5 is a view showing relationships between the gain control of the variable attenuator and the response time (response time of the change of the attenuation amount) until the gain is actually set when the gain of the variable attenuator is changed. In FIG. 5, the uppermost stage shows the transmission signal, and the lower three stages show the gain control amounts of the respective transmission pulse zones. The abscissa indicates the time t, only the ordinate of the uppermost stage showing the transmission signal indicates the reception power P, and the ordinates of the other stages indicate the attenuation amounts Gatt of the variable attenuator in the respective transmission pulse zones.

In the Tx pulse 1 zone in FIG. 5, (1) and (4) are zones where distortion of the reception signal during the response time of the attenuation amount change occurs. In the Tx pulse 2 zone, (2) and (5) are zones where distortion of the reception signal during the response time of the attenuation amount change occurs. In the Tx pulse 3 zone, (3) and (6) are zones where distortion of the reception signal during the response time of the attenuation amount change occurs.

In the embodiment, as described above, in each repetitive transmission of the pulse signal, the gain adjustment timing is shifted, and the attenuation amount of the variable attenuator is adjusted. Therefore, distortion portions of the reception signal which occur in the response time of the attenuation amount change of the variable attenuator can be dispersed in each repetitive transmission zone of the pulse signal (each transmission pulse zone), and reduction of the accuracy of the detection of the reception pulse due to degradation of the reception signal can be suppressed.

Moreover, generation of a zone where the specific time (distance) cannot be measured due to degradation of the measurement accuracy can be dispersed. Therefore, it is possible to reduce the influence of signal distortion which occurs during adjustment of the gain of the receiving unit of the radar apparatus, and degradation of the reception signal can be improved. The AGC of the radar apparatus can be realized by using an attenuator in which the response speed of the gain adjustment is low, and hence the cost reduction of the radar apparatus can be realized.

In the adding section 123 in FIG. 2, data in the response time of the attenuation amount change of the variable attenuator 108 may be removed away. In this case, the gain adjustment timing signal output from the timing adjusting section 112 is input to the adding section 123, and the addition process is performed in accordance with the timing of the gain adjustment. As a result of such a process, in the addition of the detection result of the reception pulse, it is possible to eliminate a reception signal which is degraded by distortion in the response time of the attenuation amount change, and hence degradation of the measurement accuracy can be suppressed.

Before the addition in the adding section 123, the result of the pulse detection of the reception signal outside the response time of the attenuation amount change, i.e., that of the reception pulse which is not affected by the gain adjustment may be output. In the case where the transmission number of the pulse signal is large, the gain control pattern of the variable attenuator 108 is preferably set to be random.

Here, a method may be contemplated in which the gain of the variable attenuator is set to be constant after the pulse signal is transmitted and before the next pulse signal is transmitted, and the gain is changed immediately before the next pulse signal is transmitted, or the gain of the variable attenuator is changed for each transmission of the pulse signal. In this case, when the attenuation amount is set to be small, however, there is a possibility that an incoming wave from a reflection object at a short distance may be excessively large, and exceed the upper limit of the output power of the second amplifier. Because of this, the amplifier is saturated, and an influence is caused in a portion of the reception signal which is subsequent to the incoming wave. Therefore, the method is not preferable.

Modification of First Embodiment

In the above-described first embodiment, the example which includes the variable attenuator has been described. Also in a configuration where a variable amplifier is disposed, and the gain of the amplifier is adjusted, when a gain control method corresponding to this is applied, similar effects can be attained. Hereinafter, the configuration and operation of a modification of the first embodiment will be described.

Figure 6:
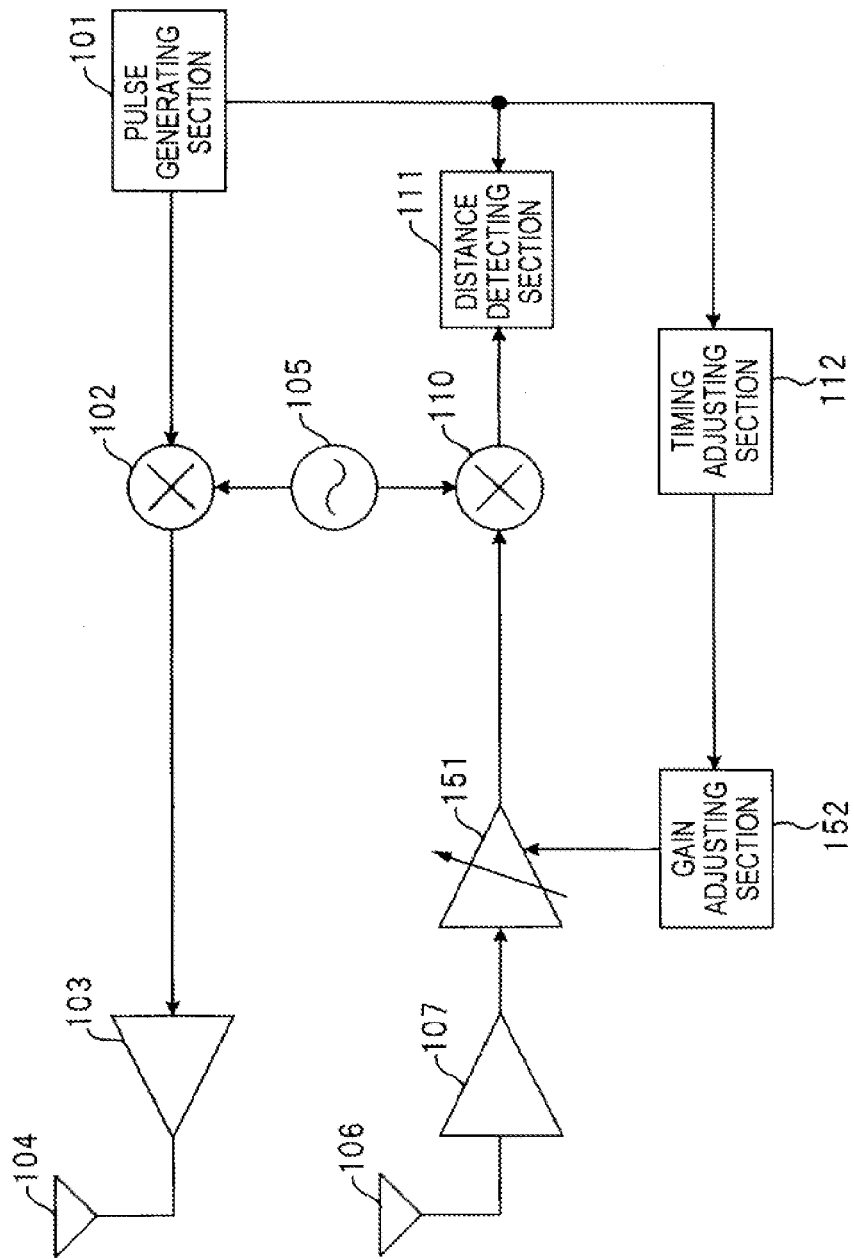
FIG. 6 is a block diagram showing the configuration of a radar apparatus of a modification of the first embodiment.

FIG. 6 is a block diagram showing the configuration of a radar apparatus of the modification of the first embodiment. In the modification, a variable amplifier 151 is disposed in place of the variable attenuator, and the operation of a gain adjusting section 152 is different from that of the above-described first embodiment. The others are identical with those of the first embodiment. Hereinafter, only different portions will be described.

The variable amplifier 151 is an example of a configuration realizing the function of the level adjusting section, and configured by having an amplifier of the variable gain type in which the amplification factor can be changed. The variable amplifier 151 receives a gain control signal from the gain adjusting section 152, and the reception signal supplied from the amplifier 107. The variable amplifier 151 adjusts the gain (amplification amount) in accordance with the gain control signal, and amplifies the reception signal supplied from the amplifier 107, by the adjusted gain to adjust the level of the reception signal.

The gain adjusting section 152 receives the gain adjustment timing signal output from the timing adjusting section 112. In accordance with the gain adjustment timing signal, the gain adjusting section 152 produces the gain control signal for setting the gain (amplification amount) of the variable amplifier 151 to a preset value, and supplies the signal to the variable amplifier 151.

The frequency converting section 110 mixes the output signal of the variable amplifier 151 with the local signal output from the local oscillator 105, and downconverts the reception signal of the radio frequency to the base band. The processes subsequent to the frequency converting section 110 are identical with those of the first embodiment which uses the variable attenuator.

Figure 7:
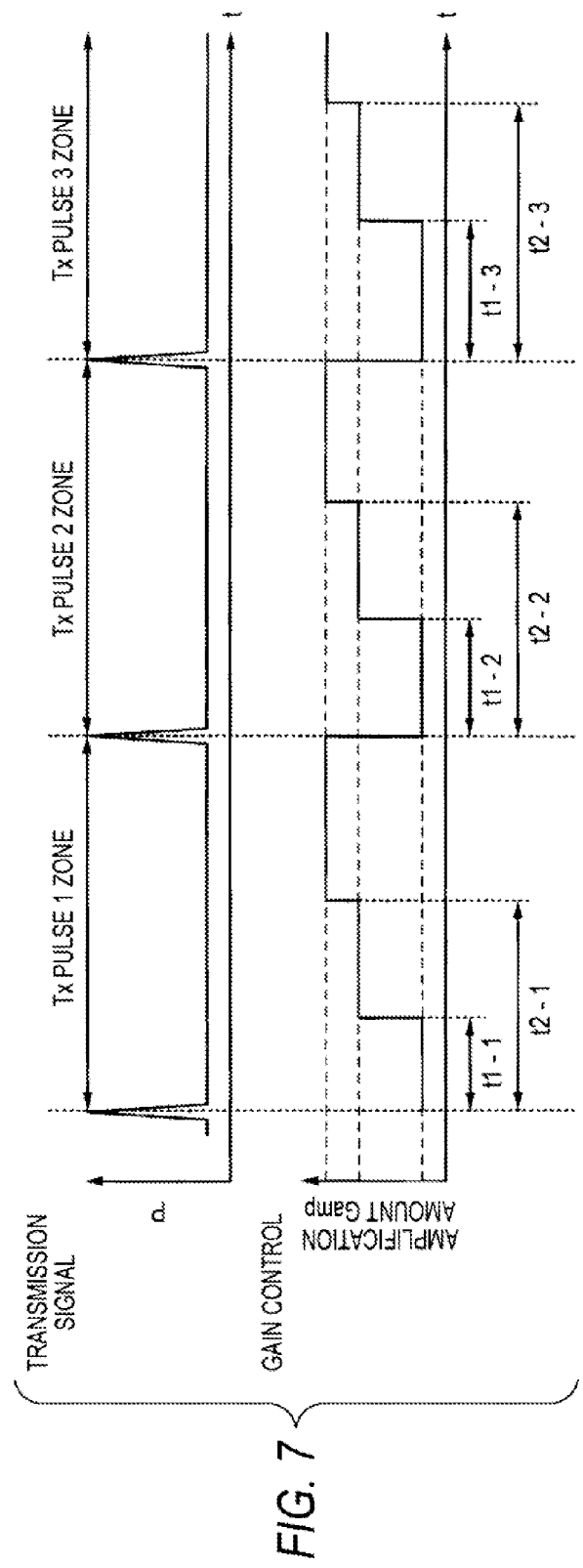
FIG. 7 is an operational diagram showing a method of adjusting the gain of a variable amplifier in the modification of the first embodiment.

FIG. 7 is an operational diagram showing a method of adjusting the gain of the variable amplifier 151 in the modification of the first embodiment. In FIG. 7, the abscissa indicates the time t. The upper stage shows the transmission signal, and the ordinate indicates the signal power P. The lower stage shows the gain control amount (gain control pattern) with respect to the transmission signal, and the ordinate indicates the amplification amount Gamp (dB) of the variable amplifier. As an example of the amplification amount of the variable amplifier 151, hereinafter, the control method will be described by using a method in which adjustment is performed in three steps.

The gain adjustment timing when the gain (amplification amount) of the variable amplifier 151 is adjusted is unchanged and identical to that in the case of the variable attenuator. In the case of the variable attenuator, the attenuation amount is reduced with the elapsed time. In the case of the variable amplifier, however, the ordinates showing the gain control indicate the attenuation amounts. Therefore, the magnitude relationship is reversed with respect to the attenuation amount, and the amplification amount is increased with the elapsed time from the transmission of the pulse signal. Namely, the gain of the variable amplifier 151 is adjusted so that the level of the reception signal is increased with elapse of time from the timing of transmission of the transmission signal.

Also in the case where a variable amplifier is disposed in place of the variable attenuator, when the gain of the variable amplifier is controlled as described above, therefore, similar effects as those in the case of the variable attenuator can be attained.

Second Embodiment

Figure 8:
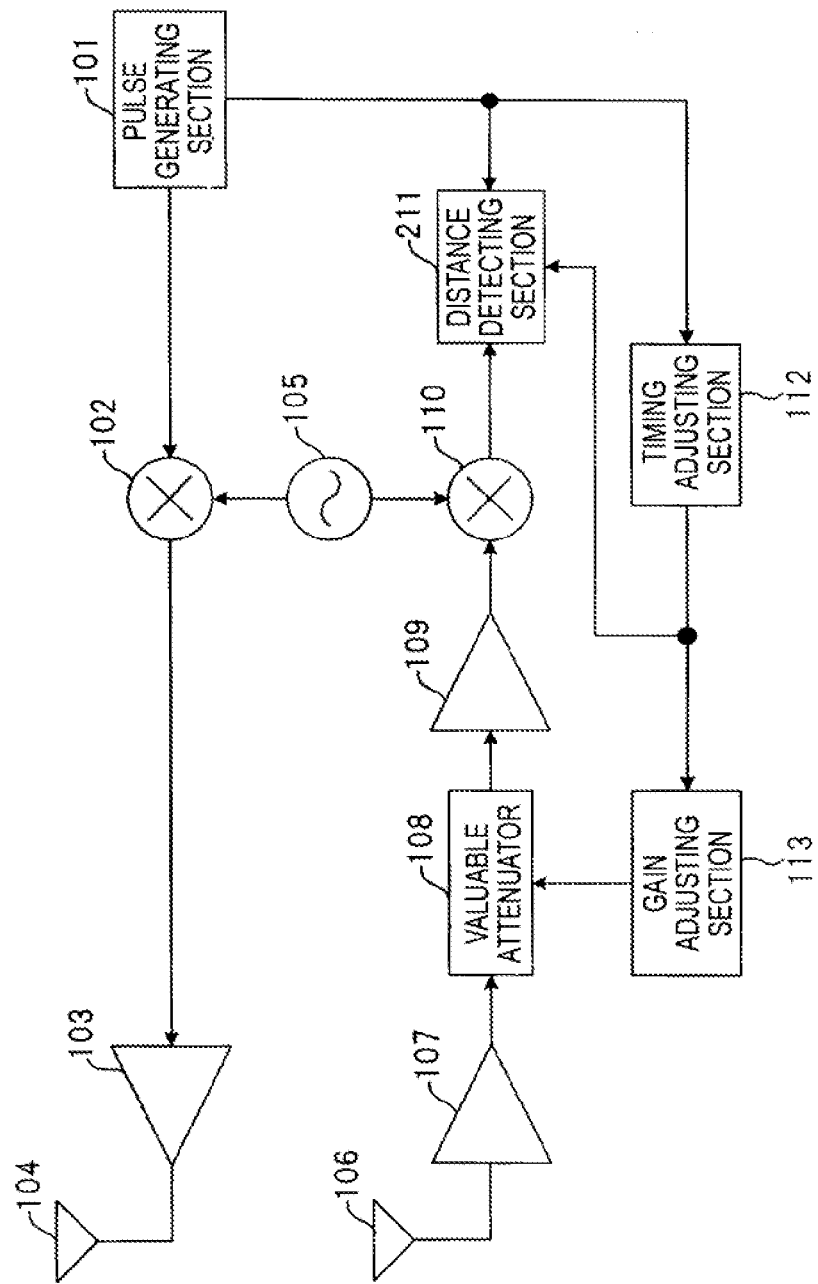
FIG. 8 is a block diagram showing the configuration of a radar apparatus of a second embodiment of the invention.

FIG. 8 is a block diagram showing the configuration of a radar apparatus of a second embodiment of the invention. The second embodiment is an example in which the configuration and operation of the distance detecting section in the first embodiment are changed. Hereinafter, description will be made with placing emphasis on portions which are different from the first embodiment.

The radar apparatus includes the pulse generating section 101, the frequency converting section 102, the amplifier 103, the antenna 104, and the local oscillator 105, as the transmitting unit. The radar apparatus further includes the antenna 106, the amplifiers 107, 109, the variable attenuator 108, the frequency converting section 110, a distance detecting section 211, the timing adjusting section 112, and the gain adjusting section 113, as the receiving unit.

The distance detecting section 211 receives: the signal which is downconverted to the base band in the frequency converting section 110; the gain adjustment timing signal output from the timing adjusting section 112; and the transmission timing signal output from the pulse generating section 101. The distance detecting section 211 receives the downconverted reception signal, performs processes of the detection process, the pulse detection process, and the distance detection process, and calculates the distance to the object.

Figure 9:
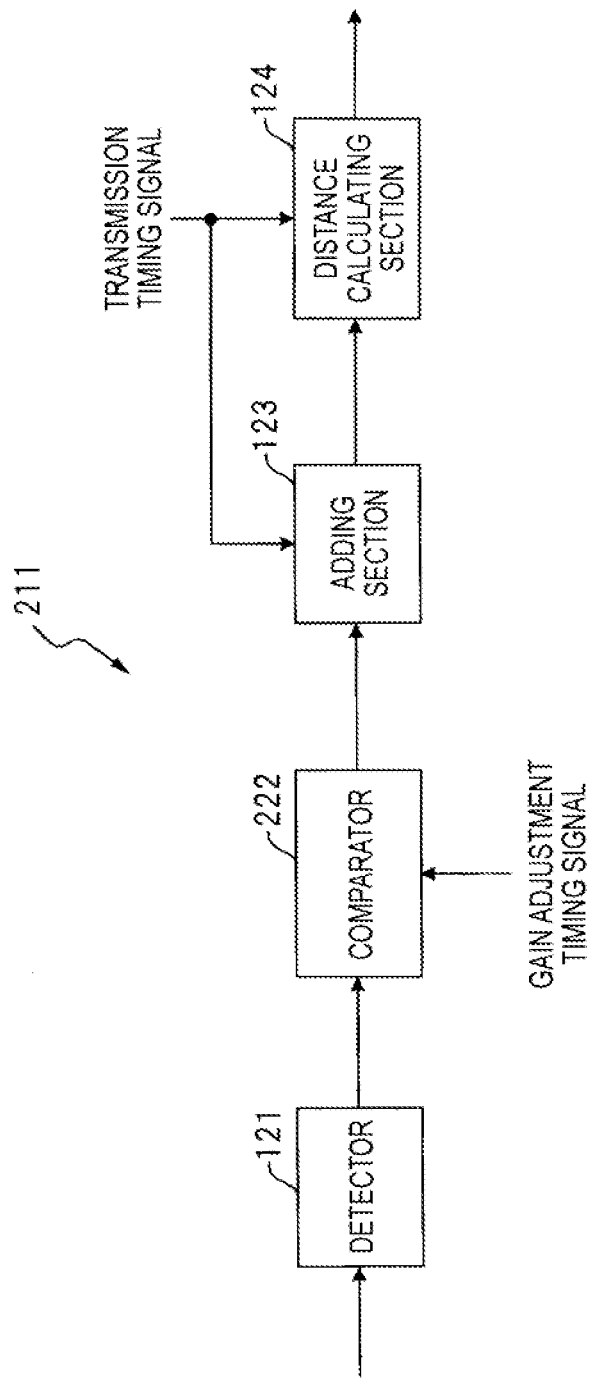
FIG. 9 is a block diagram showing the configuration of a distance detecting section in the second embodiment.

FIG. 9 is a block diagram showing the configuration of the distance detecting section in the second embodiment. The distance detecting section 211 is configured by having the detector 121, a comparator 222, the adding section 123, and the distance calculating section 124. In the distance detecting section 211 in the second embodiment, the operation of the comparator 222 is different from the first embodiment. Hereinafter, description will be made with placing emphasis on different portions.

The comparator 222 is an example of a configuration realizing the function of the reflected wave detecting section. The comparator 222 receives the detection signal output from the detector 121, and the gain adjustment timing signal output from the timing adjusting section 112. The comparator 222 compares the signal power supplied from the detector 121 with a threshold which is variably set, and convers it to a binary value consisting of the case where the signal power is larger than the threshold, and that where the signal power is smaller than the threshold.

As a result of the comparison process, detection of the reception pulse (pulse detection) is performed. The comparator 222 outputs the binary-converted signal as the result of the pulse detection. The result of the pulse detection of the reception pulse is supplied to the adding section 123. The threshold which is set in the comparator 222 is changed in accordance with the gain adjustment timing signal.

Figure 10:
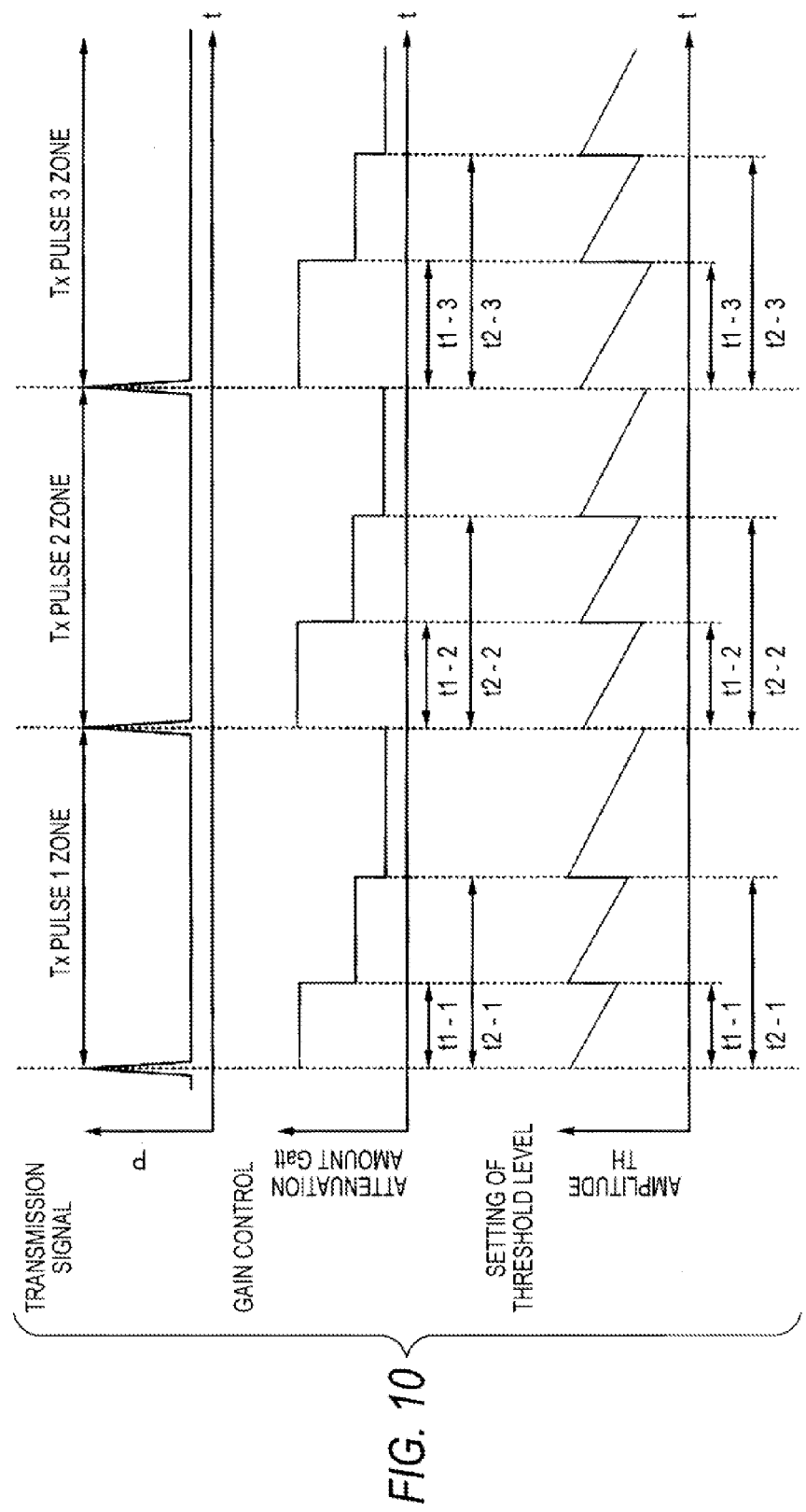
FIG. 10 is an operational diagram showing a method of adjusting the gain of a variable attenuator, and that of setting the threshold of a comparator in the second embodiment.

FIG. 10 is an operational diagram showing a method of adjusting the gain of the variable attenuator 108, and that of setting the threshold of the comparator 222 in the second embodiment, and shows time relationships among the transmission signal, the gain adjustment in the variable attenuator, and the threshold adjustment in the comparator. In FIG. 10, the abscissa indicates the time t.

The upper stage shows the transmission signal, and the ordinate indicates the signal power P. The middle stage shows the gain control amount (gain control pattern) with respect to the transmission signal, and the ordinate indicates the attenuation amount Gatt (dB) of the variable attenuator. The lower stage shows a change of the threshold level set value in the threshold control of the comparator with respect to the gain control pattern of the variable attenuator, and the ordinate indicates the amplitude TH of the threshold level. The gain adjustment in the variable attenuator 108 is similar to that of the above-described first embodiment, and therefore its description is omitted.

The threshold of the comparator 222 is controlled so that the threshold level is reduced with elapse of time. In the reception power of an incoming wave, the signal power is reduced with elapse of time from the timing when the pulse signal is transmitted. This is because the distance between the reflection object and the radar apparatus becomes longer with elapse of time.

When the gain of the variable attenuator 108 is changed so as to be reduced with elapse of time, however, also the signal power of the reception signal supplied to the comparator 222 is changed at the timing (gain adjustment timing) when the gain is changed. After the gain adjustment timing, the signal power supplied to the comparator 222 becomes larger than that before the gain adjustment timing. Therefore, also the threshold of the comparator 222 must be changed in accordance with the gain adjustment timing.

As shown in the lower stage of FIG. 10, in the Tx pulse 1 zone where the first pulse signal is transmitted, the comparator 222 first performs a control so that the threshold level is gradually lowered with elapse of time from the timing when the pulse signal is transmitted. The gradual lowering of the threshold level of the comparator 222 with elapse of time can be realized by using, for example, a digital signal processing circuit. In this case, in the digital signal processing circuit, the threshold level may be reduced step by step in accordance with the count value of a counter which measures the time, whereby a variable threshold level can be calculated and set.

Then, the comparator 222 performs a control so that the threshold level is raised at the timing t1-1 when the time passage is the gain adjustment timing. The illustrated example shows the case where the threshold level is returned to the initial value. Thereafter, the comparator 222 performs a control so that the threshold level is gradually lowered with elapse of time from t1-1. Then, the comparator performs a control so that the threshold level is raised at the timing t2-1 when the time passage is the gain adjustment timing.

Thereafter, the comparator 222 performs a control so that the threshold level is gradually lowered with elapse of time from t2-1. Namely, the comparator 222 changes the threshold level so as to be interlocked with the level adjustment of the reception signal, in synchronization with the gain adjustment timing of the variable attenuator 108.

Also in the Tx pulse 2 zone where the second pulse signal is transmitted, and the Tx pulse 3 zone where the third pulse signal is transmitted, the threshold level of the comparator 222 is controlled in accordance with the gain adjustment timing of the variable attenuator 108 in a similar manner as described above.

In the Tx pulse 2 zone, the threshold level of the comparator 222 is increased at t1-2 and t2-2 which are gain adjustment timings. In the Tx pulse 3 zone, the threshold level of the comparator 222 is increased at t1-3 and t2-3 which are gain adjustment timings. In the other zones, the threshold level is gradually reduced with elapse of time.

In the case where the threshold of the comparator is controlled, when the threshold is adjusted by a digital signal process, the response time does not produce a problem.

According to the second embodiment, the gain adjustment of the variable attenuator, and the threshold adjustment of the comparator can be controlled in a synchronized manner. Therefore, the threshold of the comparator can be adjusted to the optimum position in accordance with the timing of the gain adjustment, and the reception pulse of the reflected wave can be accurately detected.

Moreover, the signal level of the reception signal, and the comparator threshold for the pulse detection can be controlled to an adequate value. In the case where an AD converter which converts the reception signal to a digital signal is disposed, therefore, the dynamic range of the AD converter is improved.

Modification of Second Embodiment

In the above-described second embodiment, the example which includes the variable attenuator has been described. Also in a configuration where a variable amplifier is disposed, and the gain of the amplifier is adjusted, when a gain control method and comparator threshold setting method corresponding to this are applied, similar effects can be attained. Hereinafter, the configuration and operation of a modification of the second embodiment will be described.

Figure 11:
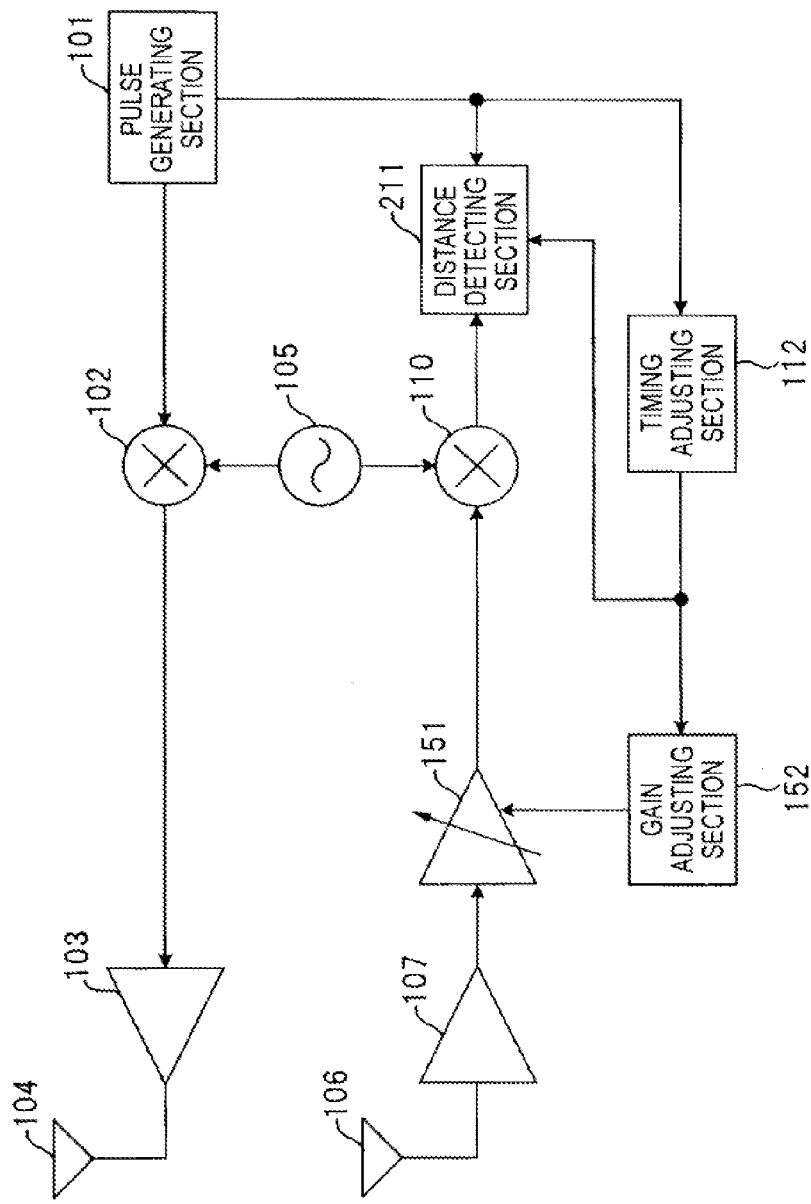
FIG. 11 is a block diagram showing the configuration of a radar apparatus of a modification of the second embodiment.

FIG. 11 is a block diagram showing the configuration of a radar apparatus of the modification of the second embodiment. In the modification, the variable amplifier 151 is disposed in place of the variable attenuator, and the operation of the gain adjusting section 152 is different from that of the above-described second embodiment. The others are identical with those of the second embodiment. Hereinafter, only different portions will be described.

While adjusting the amplification factor in accordance with the gain control signal from the gain adjusting section 152, the variable amplifier 151 amplifies the reception signal supplied from the amplifier 107 by the adjusted gain. In accordance with the gain adjustment timing signal output from the timing adjusting section 112, the gain adjusting section 152 produces the gain control signal for setting the gain (amplification amount) of the variable amplifier 151 to a preset value, and supplies the signal to the variable amplifier 151.

Figure 12:
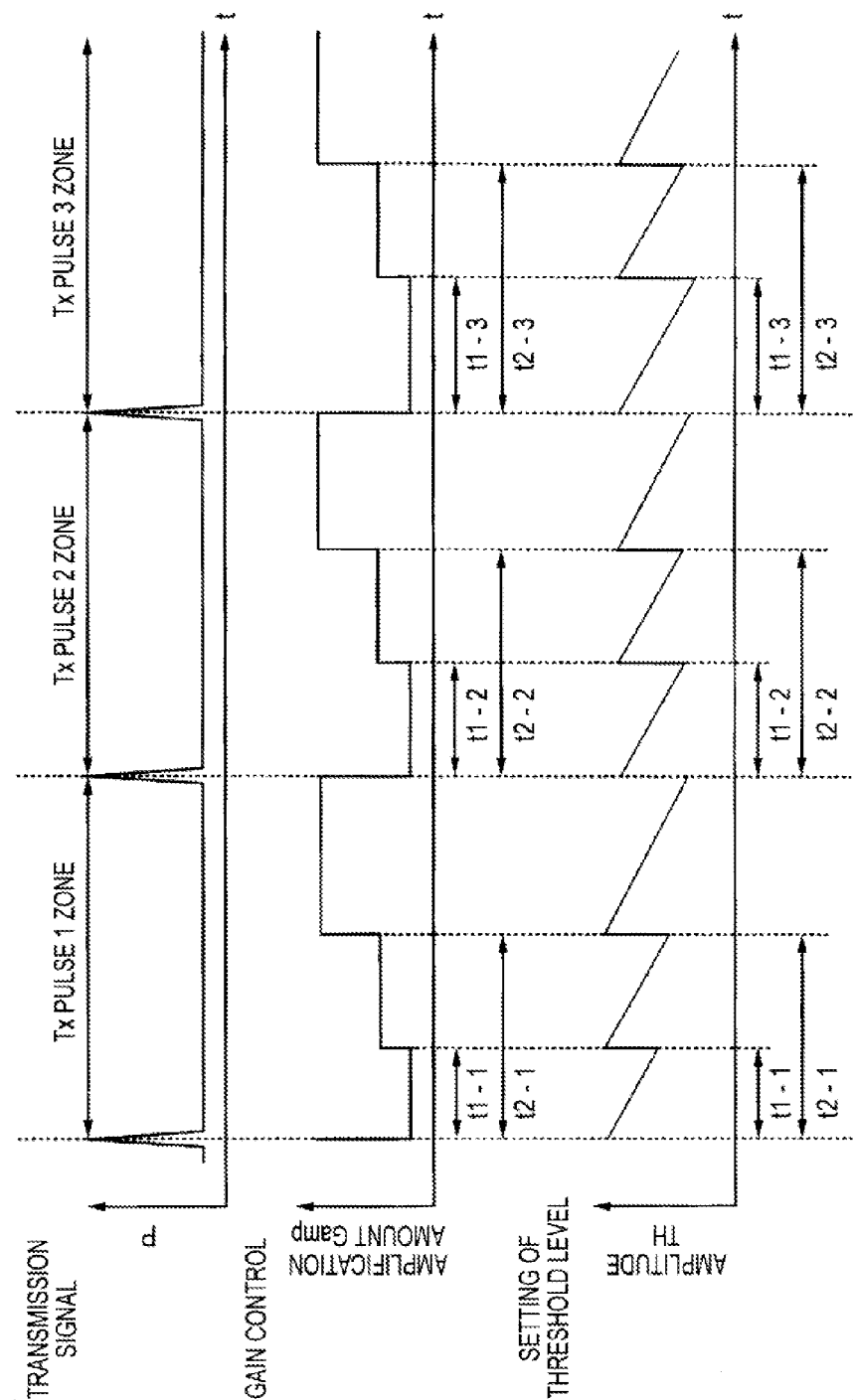
FIG. 12 is an operational diagram showing a method of adjusting the gain of a variable amplifier, and that of setting the threshold of a comparator in the modification of the second embodiment.

FIG. 12 is an operational diagram showing a method of adjusting the gain of the variable amplifier 151, and that of setting the threshold of the comparator 222 in the modification of the second embodiment. In FIG. 12, the abscissa indicates the time t. The upper stage shows the transmission signal, and the ordinate indicates the signal power P. The middle stage shows the gain control amount (gain control pattern) with respect to the transmission signal, and the ordinate indicates the amplification amount Gamp (dB) of the variable amplifier. The lower stage shows a change of the threshold level set value in the threshold control of the comparator with respect to the gain control pattern of the variable amplifier, and the ordinate indicates the amplitude TH of the threshold level.

The gain adjustment of the variable amplifier 151 is similar to that in the above-described modification of the first embodiment. In this case, the magnitude relationship is reversed with respect to the attenuation amount in the case of the variable attenuator, and the amplification amount is increased at a predetermined gain adjustment timing with the elapsed time from the transmission timing of the pulse signal. In a similar manner as the second embodiment, the threshold of the comparator 222 of the distance detecting section 211 is controlled so that the threshold level is gradually lowered with elapse of time from the transmission timing of the pulse signal, and is raised at the gain adjustment timing.

Also in the case where the variable amplifier is disposed in place of the variable attenuator, when the gain of the variable amplifier is controlled as described above, and the threshold of the comparator is adjusted in synchronization with the gain adjustment, similar effects as those in the case of the variable attenuator can be attained.

Third Embodiment

Figure 13:
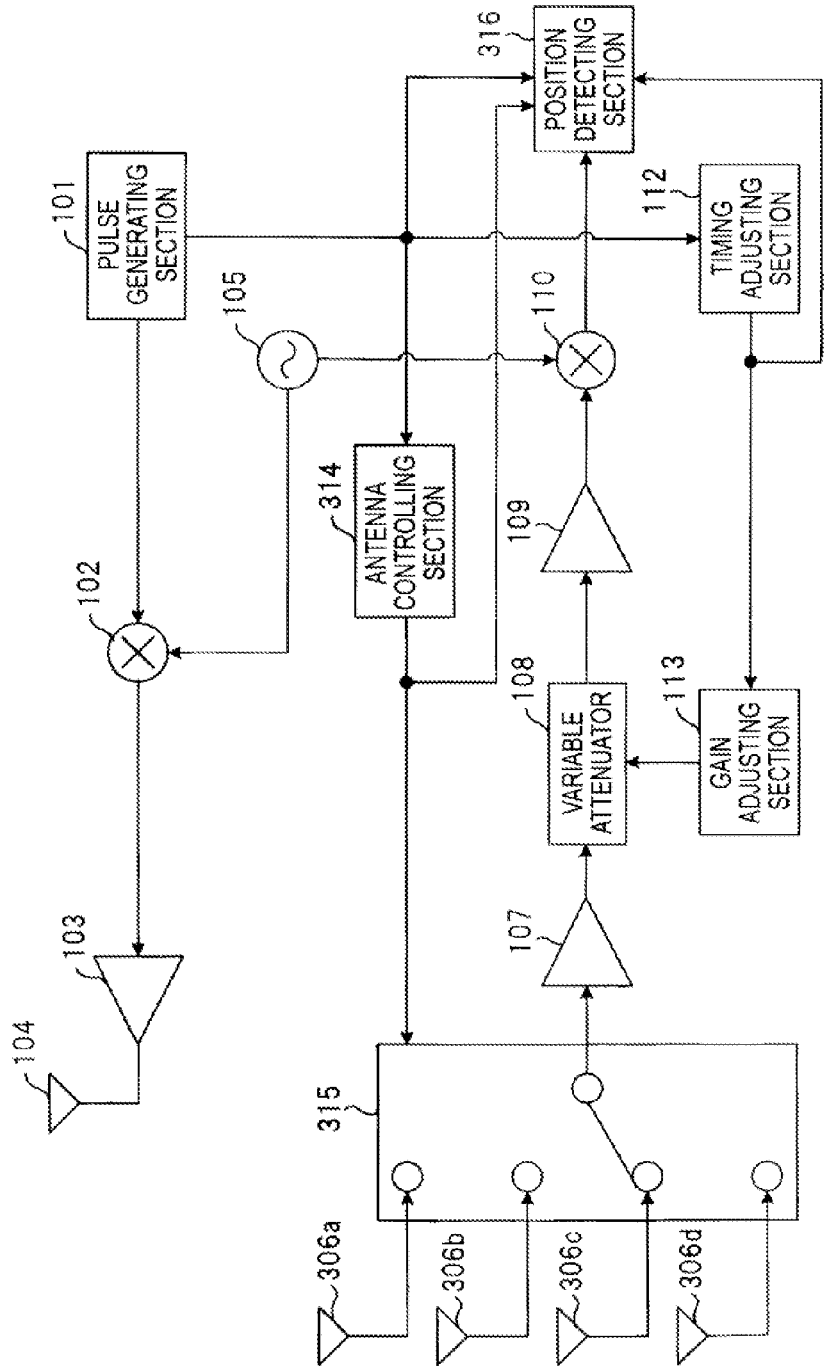
FIG. 13 is a block diagram showing the configuration of a radar apparatus of a third embodiment of the invention.

FIG. 13 is a block diagram showing the configuration of a radar apparatus of a third embodiment of the invention. The third embodiment is a configuration example of a radar apparatus having a reflection object position measuring function in which the incoming direction of the reception pulse of the reflected wave is measured by using an array antenna as the reception antenna. Several methods of measuring the incoming direction of an incoming wave have been disclosed.

Here, a configuration using a usual beam forming method will be described. A beam forming method is not directly related to the invention, and therefore its detailed description is omitted.

The radar apparatus includes the pulse generating section 101, the frequency converting section 102, the amplifier 103, the antenna 104, and the local oscillator 105, as the transmitting unit. The radar apparatus further includes a plurality of antennas 306a, 306b, 306c, 306d, an antenna controlling section 314, an antenna switch 315, the amplifiers 107, 109, the variable attenuator 108, the frequency converting section 110, the timing adjusting section 112, the gain adjusting section 113, and a position detecting section 316, as the receiving unit.

In contrast to the first or second embodiment, in the third embodiment, the antennas 306a to 306d, the antenna controlling section 314, and the antenna switch 315 are added, and the position detecting section 316 is disposed in place of the distance detecting section. Hereafter, the components which are similar to those of the first or second embodiment are denoted by the same reference numerals, and their description is omitted.

The plurality of antennas 306a to 306d which are disposed as reception antennas are arranged in a one- or two-dimensional array manner to constitute an array antenna.

The antenna switch 315 is an example of a configuration realizing the function of an antenna switching section. The antenna switch 315 switches the plurality of antennas 306a to 306d connected thereto, in accordance with an antenna switch timing signal supplied from the antenna controlling section 314. The antenna controlling section 314 receives the transmission timing signal output from the pulse generating section 101.

The antenna controlling section 314 produces the antenna switch timing signal as a control signal for causing the antenna switch 315 to perform the switching operation in synchronization with the pulse transmission timing. The timing of the antenna switching will be described later.

When the antenna switch 315 and the antenna controlling section 314 are disposed as described above and the antennas are switched over, an RF circuit of the receiving unit can be commonly used, and a cost reduction may be realized. In the case where the plurality of antennas are switched over, during a period when the gain adjustment timing is changed and the measurement is performed a plurality of times, an influence of a change of the communication environment is sometimes produced. In the third embodiment, the antennas are adequately switched over in synchronization with the gain adjustment timing, degradation of the reception signal due to a change of the communication environment can be reduced.

The position detecting section 316 is an example of a configuration realizing the function of an object detecting section. The position detecting section 316 receives: the signal which is downconverted to the base band in the frequency converting section 110; the gain adjustment timing signal output from the timing adjusting section 112; the transmission timing signal output from the pulse generating section 101; and the antenna switch timing signal output from the antenna controlling section 314.

The position detecting section 316 receives the downconverted reception signal, and performs processes of the detection process, the pulse detection process, the distance detection process, the addition process, a beam forming process, and an incoming direction detection process. Therefore, the position detecting section 316 calculates the distance to the place where the reflected wave is generated, and the incoming direction of the incoming wave, and detects the position of the object.

Figure 14:
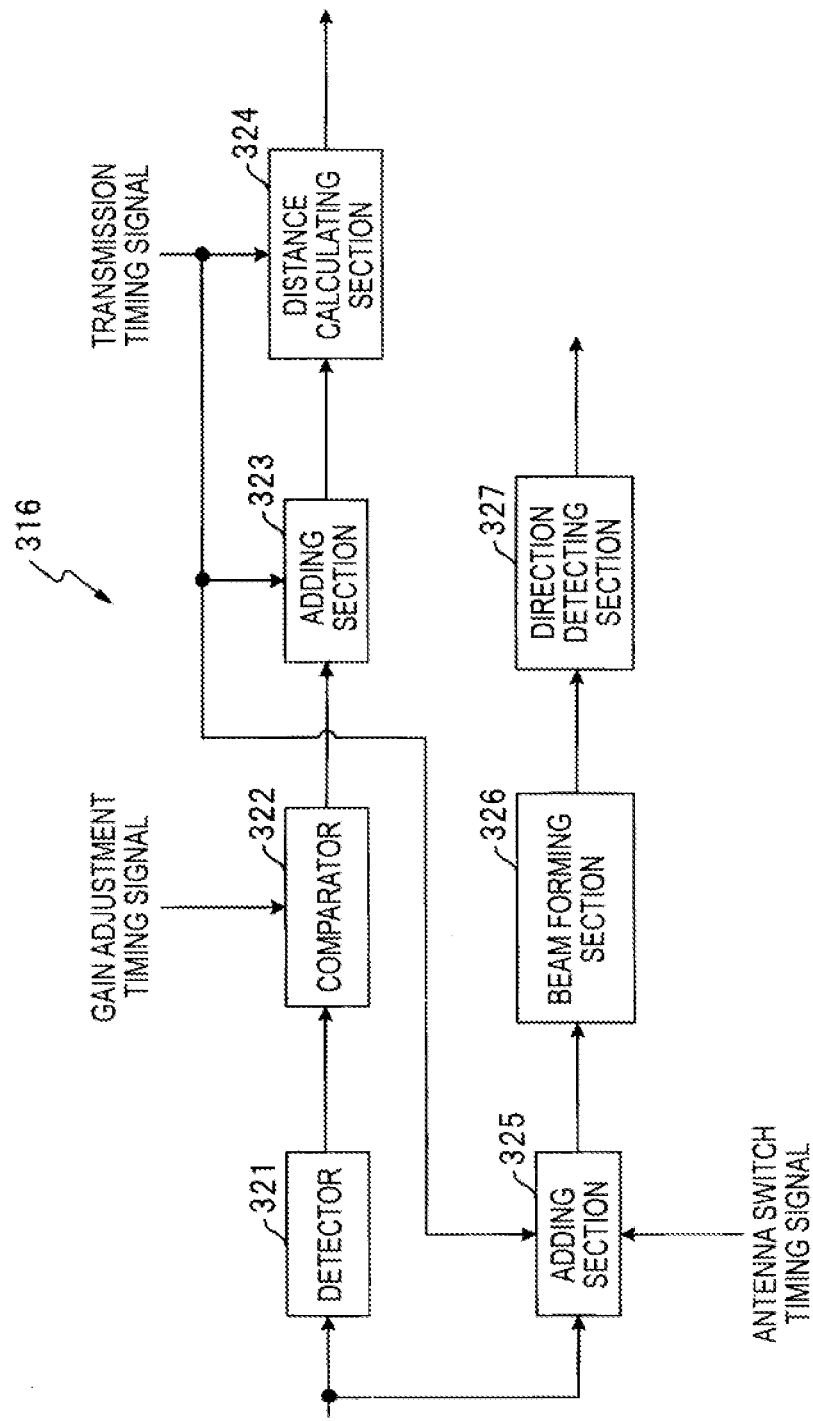
FIG. 14 is a block diagram showing the configuration of a position detecting section in the third embodiment.

FIG. 14 is a block diagram showing the configuration of the position detecting section in the third embodiment. The position detecting section 316 is configured by having a detector 321, a comparator 322, a first adding section 323, a distance calculating section 324, a second adding section 325, a beam forming section 326, and a direction detecting section 327.

The detector 321 receives the reception signal which is downconverted to the base band, obtains the signal power which is converted from the real and imaginary part signals of the reception signal to a power-domain signal, and outputs the signal power (detection signal) indicating the electric power.

The comparator 322 receives the detection signal output from the detector 321, and the gain adjustment timing signal output from the timing adjusting section 112. The comparator 322 compares the signal power of the detection signal supplied from the detector 321 with a threshold. The comparator 322 determines from the result of the comparison whether the signal power is larger or smaller than the threshold, to detect the reception pulse (pulse detection), and outputs the result of the pulse detection in the form of a binary value. The result of the pulse detection of the reception pulse is supplied to the first adding section 323.

Similarly with the comparator 222 in the above-described second embodiment, the comparator 322 controls the threshold so that the threshold level is reduced with elapse of time from the pulse transmission timing, and further so that the threshold level is raised in conformity with the gain adjustment timing of the variable attenuator 108. Alternatively, similarly with the comparator 122 in the above-described first embodiment, the pulse detection may be performed by a predetermined threshold.

The first adding section 323 adds together a predetermined number of times the result of the pulse detection in a zone from the transmission of the pulse signal from the transmitting unit to that of the next pulse signal. The addition number is N times (N is an integer) the number of the gain control patterns of the variable attenuator 108. The head of the addition process is determined in accordance with the transmission timing signal output from the pulse generating section 101. The result of the addition is supplied to the distance calculating section 324.

The distance calculating section 324 receives the addition result which is the output of the first adding section 323, and the transmission timing signal supplied from the pulse generating section 101, obtains the time from the transmission timing of the transmission pulse to the detection of the reception pulse, and calculates from the time the distance to the object.

The second adding section 325 receives: the reception signal which is downconverted to the base band; the transmission timing signal output from the pulse generating section 101; and the antenna switch timing signal output from the antenna controlling section 314. While, among data of the supplied reception signal, using data of the reception signal which are received by the same antenna, the second adding section 325 performs the addition process on data of the reception signal having the same delay time.

As a result of the addition process, for each of the antennas, data of the reception signal which are added together depending on the delay time of the pulse transmission period are produced as addition data, and then output.

The beam forming section 326 receives the addition data output from the second adding section 325. The beam forming section 326 performs a predetermined signal process on the supplied addition data, thereby applying the beam forming process. As a result of the beam forming process, the beam forming section 326 calculates the signal power for each angle, and then outputs it.

Hereinafter, the beam forming process will be described. In the beam forming process, as shown in Expression (2) below, the correlation value Rxx for each antenna is calculated with respect to the reception signal. The value Rxx is referred to as the correlation matrix. In the expression, * indicates complex conjugation, and m means the reception signal of an n-th antenna. Expression (2) shows an example in which four reception antennas are used.

[Exp. 1]

$$Rxx = \begin{pmatrix} r_1 r_1^* & r_1 r_2^* & r_1 r_3^* & r_1 r_4^* \\ r_2 r_1^* & r_2 r_2^* & r_2 r_3^* & r_2 r_4^* \\ r_3 r_1^* & r_3 r_2^* & r_3 r_3^* & r_3 r_4^* \\ r_4 r_1^* & r_4 r_2^* & r_4 r_3^* & r_4 r_4^* \end{pmatrix} \quad (2)$$

Next, the obtained Rxx is substituted in Expression (3) below, and the signal power Pout for each angle is calculated. In the expression, $a(\theta)$ is a mode vector, and H indicates a Hermitian transpose. The detail of the beam forming process is disclosed in the following non-patent document ([Non-patent Document] KIKUMA Nobuyoshi, "ADAPTIVE ANTENNA TECHNIQUE", Ohmsha, October 2003, p. 126).

[Exp. 2]

$$P_{out} = a^{11}(\theta) Rxx \, a(\theta) \quad (3)$$

The direction detecting section 327 receives the signal power Pout for each angle which is output from the beam forming section 326. The direction detecting section 327 detects the incoming direction of the incoming wave from the signal power which is calculated for each angle. As the method of detecting the incoming direction, for example, a method in which the angle of the highest signal power is determined as the incoming wave may be employed. The direction detecting section 327 outputs the detected angle as the result of the detection of the incoming direction.

Figure 15:
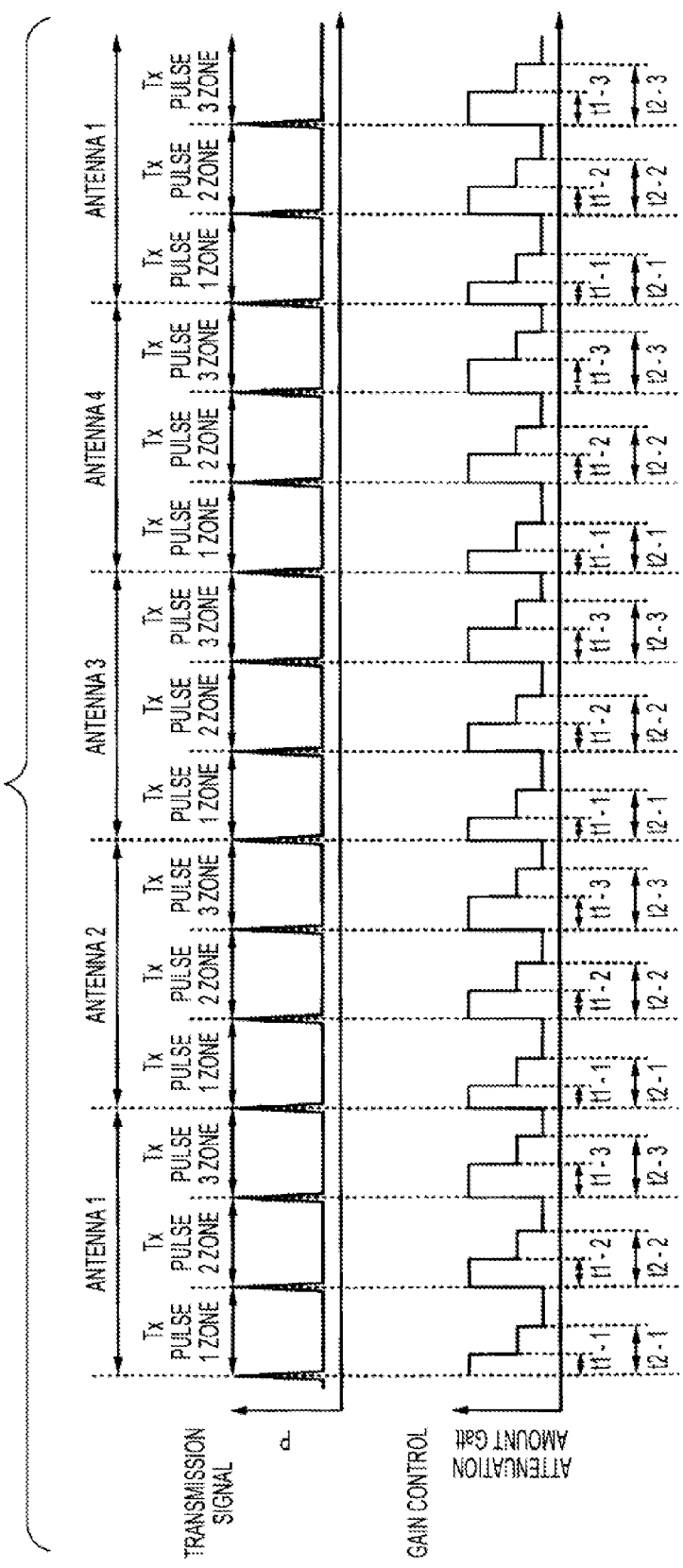
FIG. 15 is an operational diagram showing a method of switching antennas by an antenna switch, and that of adjusting the gain of a variable attenuator in the third embodiment.

FIG. 15 is an operational diagram showing a method of switching the antennas by the antenna switch 315, and that of adjusting the gain of the variable attenuator 108 in the third embodiment, and shows time relationships among the switching of the antennas, the transmission signal, and the gain adjustment in the variable attenuator. In FIG. 15, the abscissa indicates the time t. The upper stage shows the transmission signal, and the ordinate indicates the signal power P. The lower stage shows the gain control amount (gain control pattern) with respect to the transmission signal, and the ordinate indicates the attenuation amount Gatt (dB) of the variable attenuator.

The zones (the Tx pulse 1 zone to the Tx pulse 3 zone) where the pulse signal is to be transmitted, and the antennas (1 to 4) to be switched are correspondingly shown above the waveform of the reception signal. The gain adjustment in the variable attenuator 108 is similar to that of the above-described first embodiment, and therefore its description is omitted.

First, the gain control in the variable attenuator 108 is performed while changing the gain adjustment timing (gain control pattern) for each transmission of the pulse signal, and the signal is received through Antenna 1 (306a). In the illustrated example, the pulse signal is transmitted three times at the predetermined pulse transmission period for each of the reception antennas (the Tx pulse 1 zone, the Tx pulse 2 zone, the Tx pulse 3 zone), and the pulse signal is received while switching over three kinds of gain adjustment timings for each of the transmission pulse zones.

After transmission and reception of the pulse signal have been performed three times through Antenna 1, the antenna controlling section 314 outputs the antenna switch timing signal to the antenna switch 315, and the antenna switch 315 is switched to Antenna 2 (306b). Similarly with the case of Antenna 1, then, reception is performed through Antenna 2 while switching over three kinds of gain adjustment timings. Thereafter, the antenna controlling section 314 outputs the antenna switch timing signal, and the antenna switch 315 is switched to Antenna 3 (306c). Similar processes are repeated until Antenna 4 (306d).

In the third embodiment, as described above, the timing of the operation of switching the plurality of antennas 306a to 306d which is performed by the antenna switch 315 is set to be M times (M is an integer) the number of the gain control patterns of the variable attenuator 108. Namely, the antenna switch period is set so that the switching of the array antenna is performed every time that is an integer multiple of the number of the gain control patterns where different gain adjustment timings are set. In the illustrated example, the number of the gain control patterns is 3, and M=1.

Transmission and reception of the pulse signal are performed through from Antenna 1 to Antenna 4 to acquire the reception signal, the position detecting section 316 measures the reception pulse of the reflected wave, and the correlation matrix of the reception signal is calculated for each of the antennas. In this case, in the second adding section 325, with respect to data of the reception signal which are acquired while switching the gain of the variable attenuator 108, the addition is performed on data in which the elapsed time from transmission of the pulse signal is identical. In the case where the addition is to be performed, data of the response time of the attenuation amount change which occurs when the gain of the variable attenuator 108 is switched may be eliminated.

According to the third embodiment, the direction of the incoming wave can be detected while times of measuring the incoming wave by using the same antenna, i.e., acquisition times in the case where a plurality of reception signals are acquired while changing the gain adjustment timing of the same antenna are set to be close to each other. Even under a dynamic environment where the object moves, therefore, it is possible to reduce degradation of correlation characteristics in the case where data of the reception signal acquired while changing the gain adjustment timing are added together. Consequently, degradation of the reception signal due to the response time of the gain adjustment can be evenly dispersed to the respective antennas, and degradation of the measurement accuracy can be suppressed.

In the third embodiment, when execution is to be performed while the antenna switch timing and the gain adjustment timing are synchronized with each other, the gain adjustment timing is changed in preference to the antenna switching. In this case, a plurality of reception signals are acquired through the same antenna while changing the gain adjustment timing, and autocorrelation is calculated by using a result of addition with respect to, among the reception signals received through the same antenna, reception signals having the same delay time. As compared with the case where autocorrelation is calculated by using reception signals which are acquired while switching antennas, therefore, degradation of the result of the autocorrelation calculation can be improved.

Modification of Third Embodiment

In the above-described third embodiment, the example which includes the variable attenuator has been described. Also in a configuration where a variable amplifier is disposed, and the gain of the amplifier is adjusted, when an antenna switch method and gain control method corresponding to this are applied, similar effects can be attained. Hereinafter, the configuration and operation of a modification of the third embodiment will be described.

Figure 16:
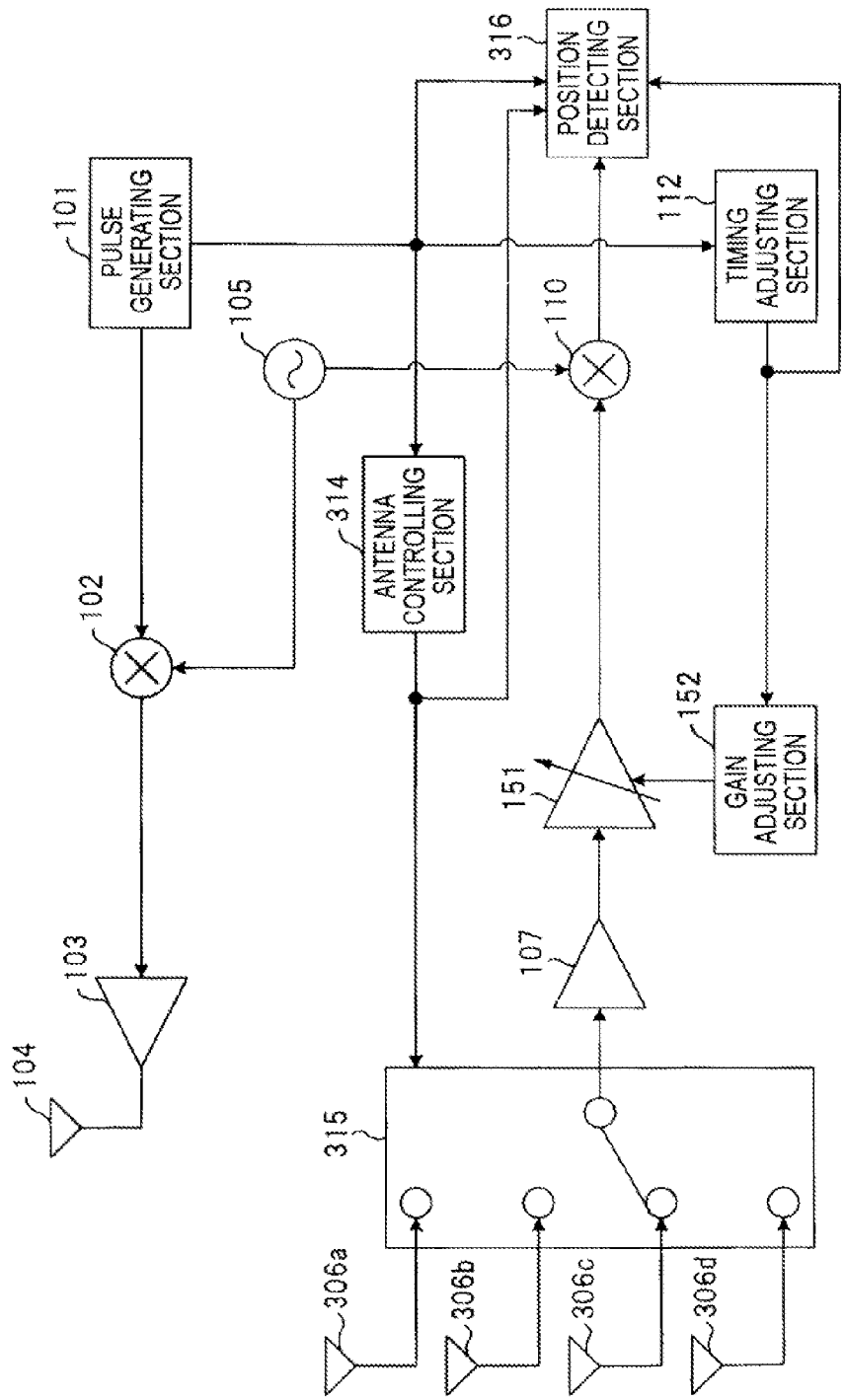
FIG. 16 is a block diagram showing the configuration of a radar apparatus of a modification of the third embodiment.
Figure 17:
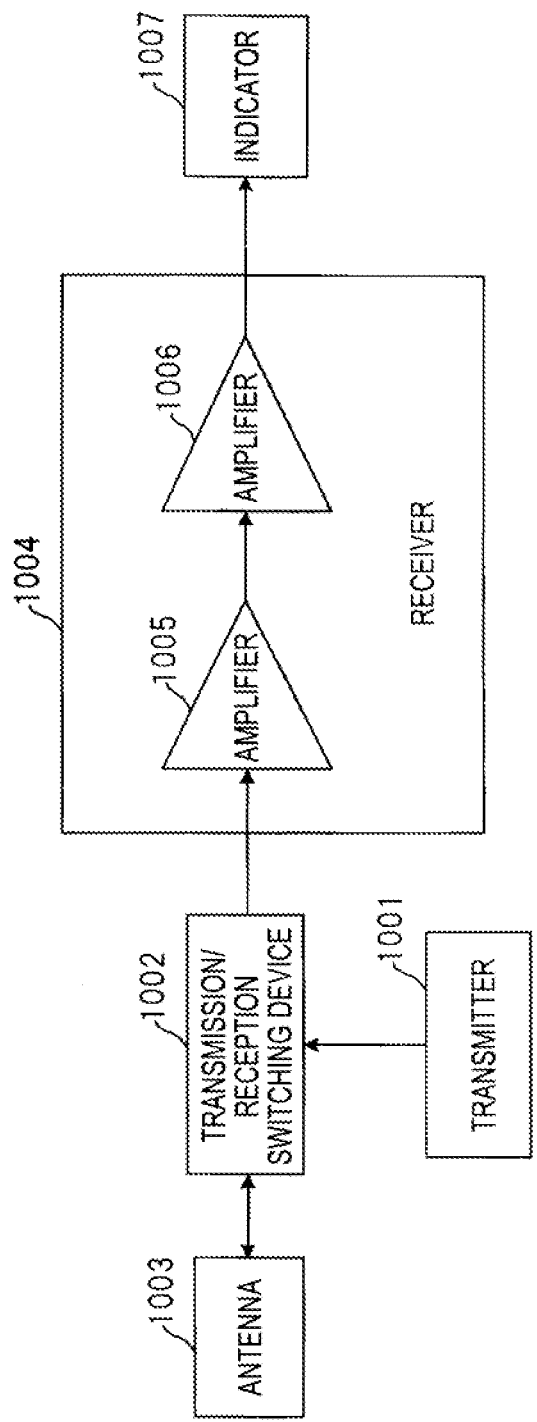
FIG. 17 is a block diagram showing the configuration of a radar apparatus of a conventional example.
Figure 18:
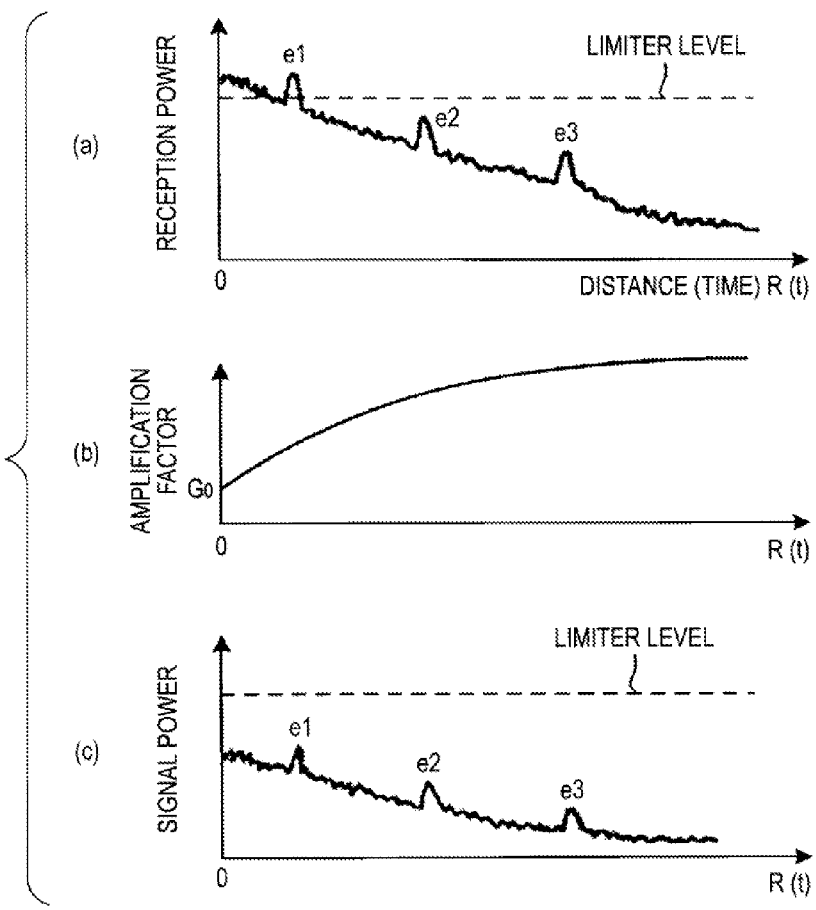
FIG. 18 is a waveform chart illustrating the operation of the radar apparatus of the conventional example.

FIG. 16 is a block diagram showing the configuration of a radar apparatus of the modification of the third embodiment. In the modification, the variable amplifier 151 is disposed in place of the variable attenuator, and the operation of the gain adjusting section 152 is different from that of the above-described third embodiment. The others are identical with those of the third embodiment. Hereinafter, only different portions will be described.

While adjusting the amplification factor in accordance with the gain control signal supplied from the gain adjusting section 152, the variable amplifier 151 amplifies the reception signal supplied from the amplifier 107 by the adjusted gain. In accordance with the gain adjustment timing signal output from the timing adjusting section 112, the gain adjusting section 152 produces the gain control signal for setting the gain (amplification amount) of the variable amplifier 151 to a preset value, and supplies the signal to the variable amplifier 151.

The gain adjustment in the variable amplifier 151 is similar to that in the modification of the first embodiment shown in FIG. 7, or that in the modification of the second embodiment shown in FIG. 12. In this case, the magnitude relationship is reversed with respect to the attenuation amount in the case of the variable attenuator, and the amplification amount is increased at a predetermined gain adjustment timing with the elapsed time from the transmission timing of the pulse signal.

Similarly with the third embodiment, while switching the plurality of antennas, the reception signal in which the gain is adjusted by changing the gain adjustment timing is acquired a plurality of times for each of the antennas, the distance to the place where the reflected wave is generated, and the incoming direction of the incoming wave are calculated, and the position of the reflected wave from the object is detected.

Also in the case where a variable amplifier is disposed in place of the variable attenuator, when the gain of the variable amplifier is controlled as described above, therefore, similar effects as those in the case of the variable attenuator can be attained.

In the invention, it is expected that those skilled in the art will change or apply the matters based on the description in the description and the well-known technique without departing the spirit and scope of the invention, and such a change or application is included in the range to be protected. Furthermore, components of the embodiments may be arbitrarily combined with one another without departing the spirit of the invention.

Although, in the embodiments, the case where the invention is configured by hardware has been exemplarily described, the invention can be realized by software.

Typically, the functional blocks which are used in the descriptions of the embodiments are realized in the form of an LSI which is an integrated circuit. They may be individually integrated in one chip, or part or all of them may be integrated in one chip. Although such an integrated circuit is referred to as an LSI, such an integrated circuit may be called an IC, a system LSI, a super LSI, or an ultra LSI depending on the degree of integration.

The method of realizing such an integrated circuit is not limited to an LSI, and the integrated circuit may be realized by a dedicated circuit or a general-purpose processor. Alternatively, it is also possible to use an FPGA (Field Programmable Gate Array) which can be programmed after the production of the LSI, or a reconfigurable processor in which the connections or settings of circuit cells in the LSI can be reconfigured.

Furthermore, with the advancement of semiconductor technologies or other technologies derived therefrom, when integrated circuit technologies which replace LSIs emerge, it is a matter of course that the functional blocks may be integrated using such technologies. The applications of biotechnologies, and the like are possible.

The application is based on Japanese Patent Application (No. 2010-169293) filed Jul. 28, 2010, and its disclosure is incorporated herein by reference.

INDUSTRIAL APPLICABILITY

The invention has an effect in which an influence of signal distortion which occurs during adjustment of the gain of a receiving unit of a radar apparatus can be reduced, and degradation of a reception signal can be improved. The invention is useful as, for example, a radar apparatus which, based on a reflected wave from an object with respect to a transmission signal, identifies the position of the object, and particularly as a radar apparatus which uses the wideband pulse technology.

DESCRIPTION OF REFERENCE NUMERALS AND SIGNS 101 pulse generating section
102, 110 frequency converting section
103 amplifier
104, 106, 306a, 306b, 306c, 306d antenna
105 local oscillator
107, 109 amplifier
108 variable attenuator
111, 211 distance detecting section
112 timing adjusting section
113, 152 gain adjusting section
121, 321 detector
122, 222, 322 comparator
123 adding section
124, 324 distance calculating section
151 variable amplifier
314 antenna controlling section
315 antenna switch
316 position detecting section
323 first adding section
325 second adding section
326 beam forming section
327 direction detecting section

The invention claimed is:
1. A radar apparatus comprising:
a transmission signal generator that generates a transmission signal which is an intermittent signal having a predetermined signal width and signal interval;
a RF transmitter that wirelessly transmits the transmission signal to a measurement space during a transmission period;

a RF receiver that receives a reception signal including a reflected wave from an object, from the measurement space;

a timing adjuster that adjusts a plurality of length of gain adjustment periods in the transmission period, each gain adjustment periods have different lengths, respectively for each transmission period of the transmission signal;

a gain adjuster that generates a gain control signal for increasing the level of the received signal in accordance with the plurality of adjusted gain adjustment periods;

a level adjuster that adjusts a level of the reception signal by a variable gain based on the gain control signal; and an object detector that detects the object based on the level-adjusted reception signal.

2. The radar apparatus according to claim 1, wherein the timing adjuster adjusts time which is longer than a response time required for the gain adjustment in the level adjuster as a difference between the gain adjustment periods in each transmission period.

3. The radar apparatus according to claim 1, wherein the object detector includes an adder which adds the level-adjusted reception signals in each the transmission periods.

4. The radar apparatus according to claim 1, wherein the object detecting section includes:

a reflected wave detector which detects a signal of the reflected wave from the object, from the level-adjusted reception signal; and a distance calculator which calculates a distance from the object based on a result of the detection of the reflected wave.

5. The radar apparatus according to claim 4, wherein the reflected wave detector includes a comparator which compares the level-adjusted reception signal with a predetermined threshold to detect the signal of the reflected wave from the object; and wherein the comparator changes the threshold in conjunction with the level adjustment of the reception signal, in synchronization with the adjusted gain adjustment period.

6. The radar apparatus according to claim 1, wherein the RF receiver includes a plurality of antennas which are arranged in an array manner, an antenna controller which generates an antenna switch timing signal for controlling the antenna switcher, and an antenna switcher which switches the plurality of antennas based on the antenna switch timing signal; and wherein the antenna controller generates the antenna switch timing signal for switching the plurality of antennas in each period which is an integer multiple of amounts of the gain adjustment periods.

7. The radar apparatus according to claim 6, wherein the gain adjuster performs an adjustment of the gain adjustment periods in preference to the antenna switching by the antenna controller.

8. The radar apparatus according to claim 6, wherein the object detector includes:

a second adder which, based on the antenna switch timing signal, among the level-adjusted reception signals, adds signals which are received by a same antenna and which have a same delay time; and a direction detector which detects an incoming direction of the reflective wave from the object based on a result of the addition of the second adder.

9. The radar apparatus according to claim 1, wherein the level adjuster has a variable attenuator; and wherein the gain adjuster adjusts an attenuation amount of the variable attenuator.

10. The radar apparatus according to claim 1, wherein the level adjuster has a variable amplifier; and wherein the gain adjuster adjusts an amplification amount of the variable amplifier.

* * * * *